United States Patent
Johnson, Jr.

(10) Patent No.: US 8,122,628 B2
(45) Date of Patent: Feb. 28, 2012

(54) PORTABLE ADVERTISING PLATFORM

(75) Inventor: Theodore C. Johnson, Jr., Frisco, CO (US)

(73) Assignee: Freight Train Media LLC, Cleveland, OH (US)

( * ) Notice: Subject to any disclaimer, the term of this patent is extended or adjusted under 35 U.S.C. 154(b) by 114 days.

(21) Appl. No.: 12/544,859

(22) Filed: Aug. 20, 2009

(65) Prior Publication Data

US 2010/0043264 A1 Feb. 25, 2010

Related U.S. Application Data

(60) Provisional application No. 61/189,627, filed on Aug. 21, 2008.

(51) Int. Cl.
G09F 21/04 (2006.01)
G09F 13/18 (2006.01)
G09F 13/02 (2006.01)
G09F 13/00 (2006.01)
G09F 13/04 (2006.01)
G09F 7/00 (2006.01)

(52) U.S. Cl. ............... 40/591; 40/592; 40/593; 40/603; 40/546; 40/559; 40/560; 40/605; 40/564; 348/834; 348/835

(58) Field of Classification Search ............... 40/591, 40/592, 593, 603, 546, 559, 560, 605, 564; 348/834, 835
See application file for complete search history.

(56) References Cited

U.S. PATENT DOCUMENTS

| | | | |
|---|---|---|---|
| 4,176,483 A * | 12/1979 | Bailey | 40/467 |
| 4,287,349 A * | 9/1981 | Fields | 548/166 |
| 5,815,969 A * | 10/1998 | Brouwer | 40/574 |
| 6,042,243 A * | 3/2000 | Grill et al. | 362/125 |
| 6,351,904 B1 * | 3/2002 | Hermanson | 40/715 |
| 6,765,550 B2 * | 7/2004 | Janick et al. | 345/87 |
| 6,846,083 B1 * | 1/2005 | Mylar | 359/612 |
| 6,994,448 B1 * | 2/2006 | Gorrell | 362/183 |
| 7,020,992 B1 * | 4/2006 | Christie | 40/593 |
| 2006/0207136 A1 * | 9/2006 | Blum | 40/473 |
| 2010/0126543 A1 * | 5/2010 | Cutler | 135/117 |

* cited by examiner

Primary Examiner — Joanne Silbermann
Assistant Examiner — Syed A Islam
(74) Attorney, Agent, or Firm — Sand & Sebolt

(57) ABSTRACT

The portable advertising system of the present invention comprises a body having a first end and a display support, at least one universal attachment system adapted for securing the body to a vehicle proximate the first end, at least one exterior wall arranged to display an advertisement, and the display support securing an illumination source directed towards the at least one exterior wall. The at least one exterior wall and the illumination source may be integrated into an electronic display unit. The at least one exterior wall may also be an advertising sheet composed of vinyl and the illumination source may be a plurality of light emitting diodes. The portable advertising system may include a railroad car arranged to receive the at least one universal attachment system.

33 Claims, 22 Drawing Sheets

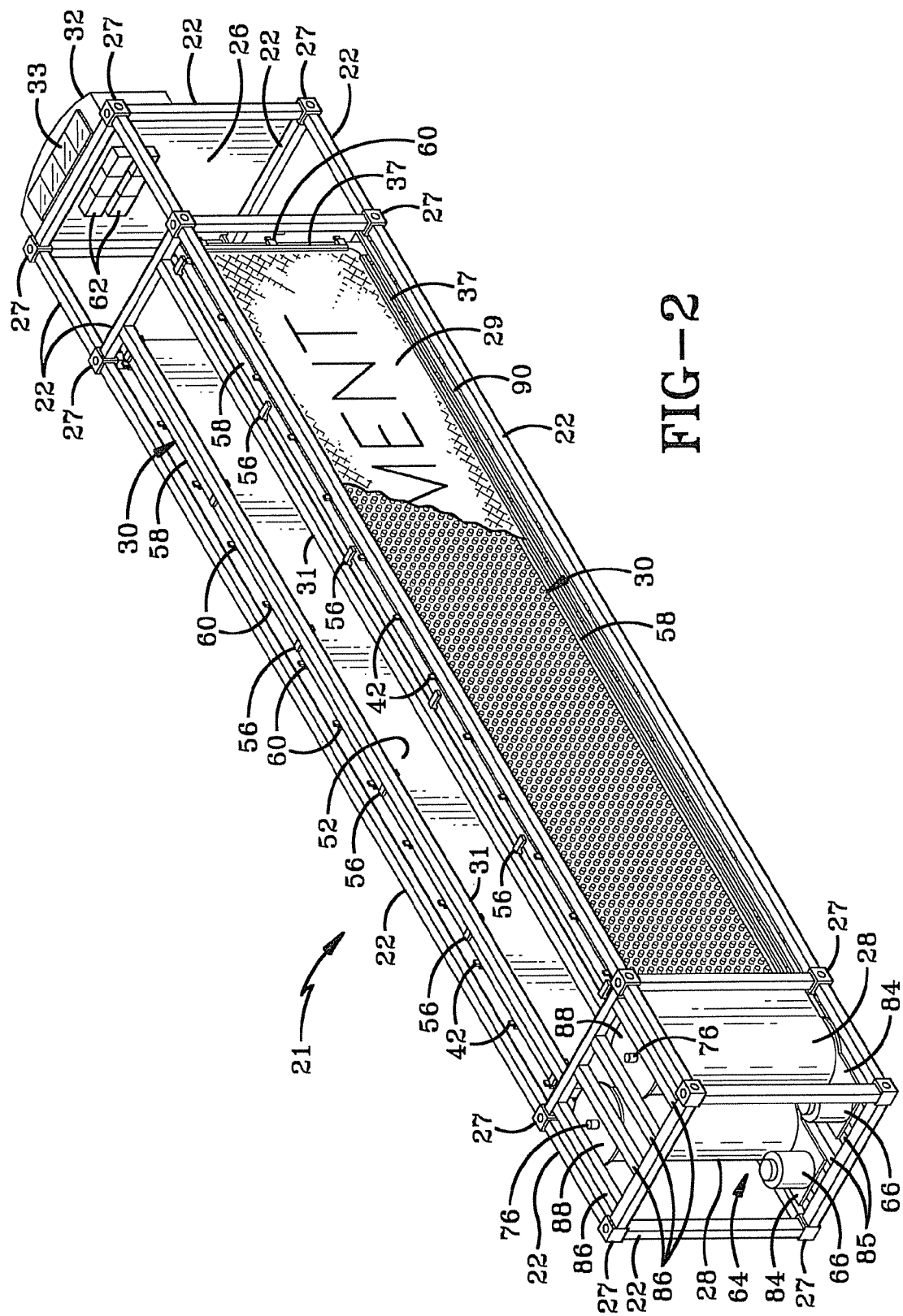

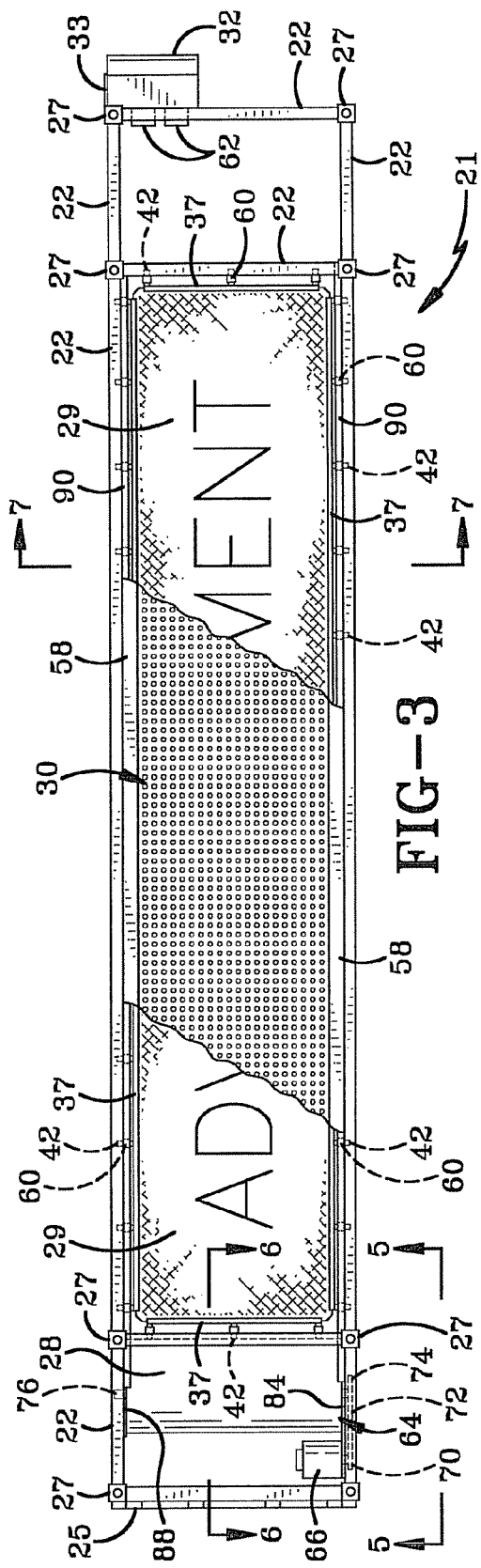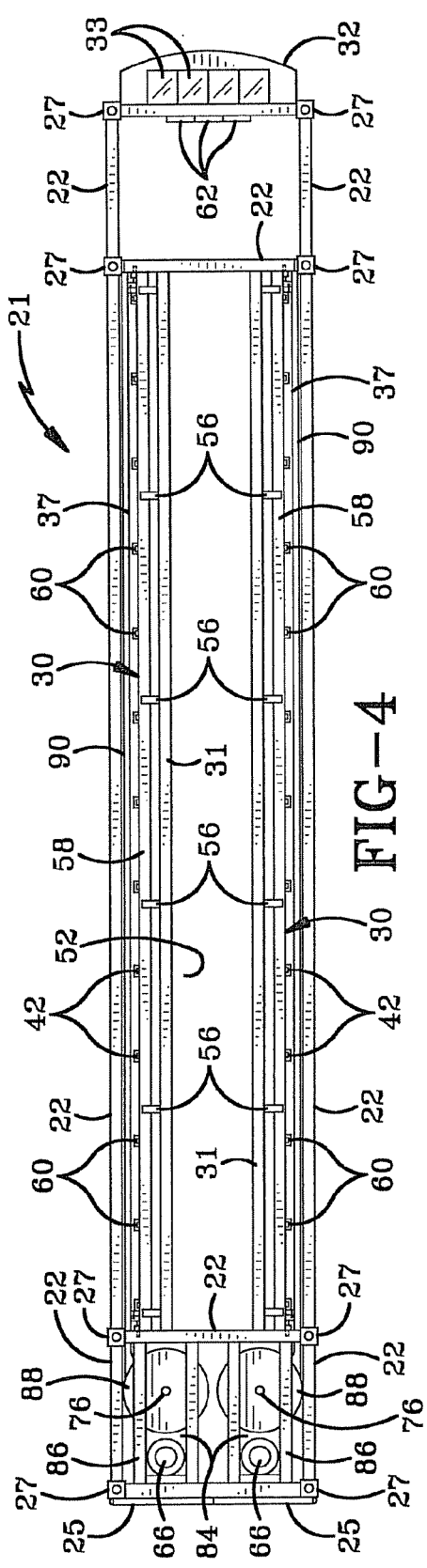

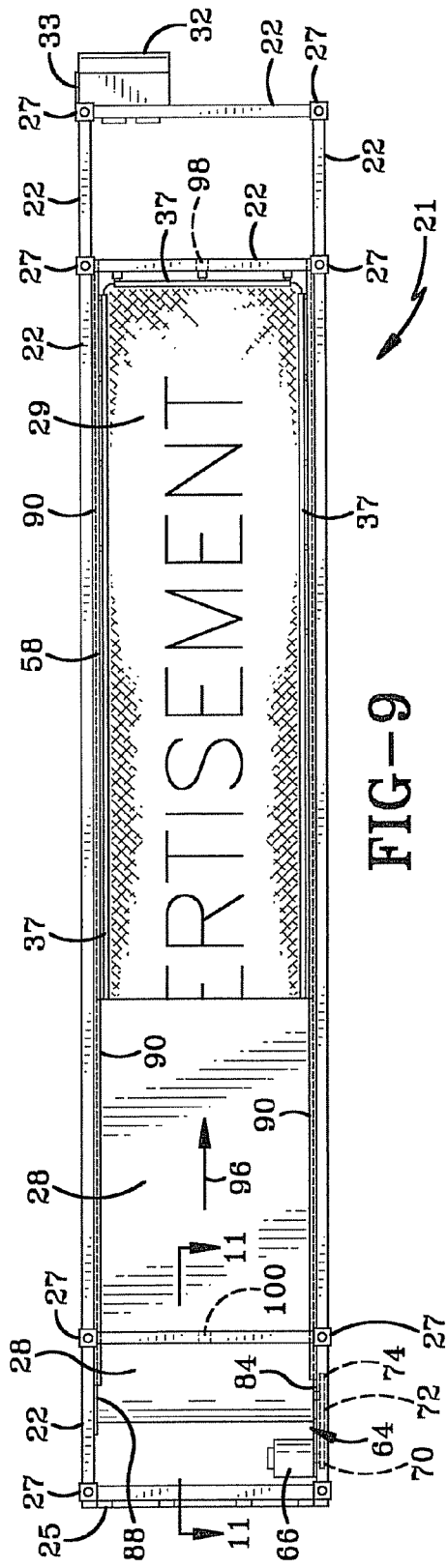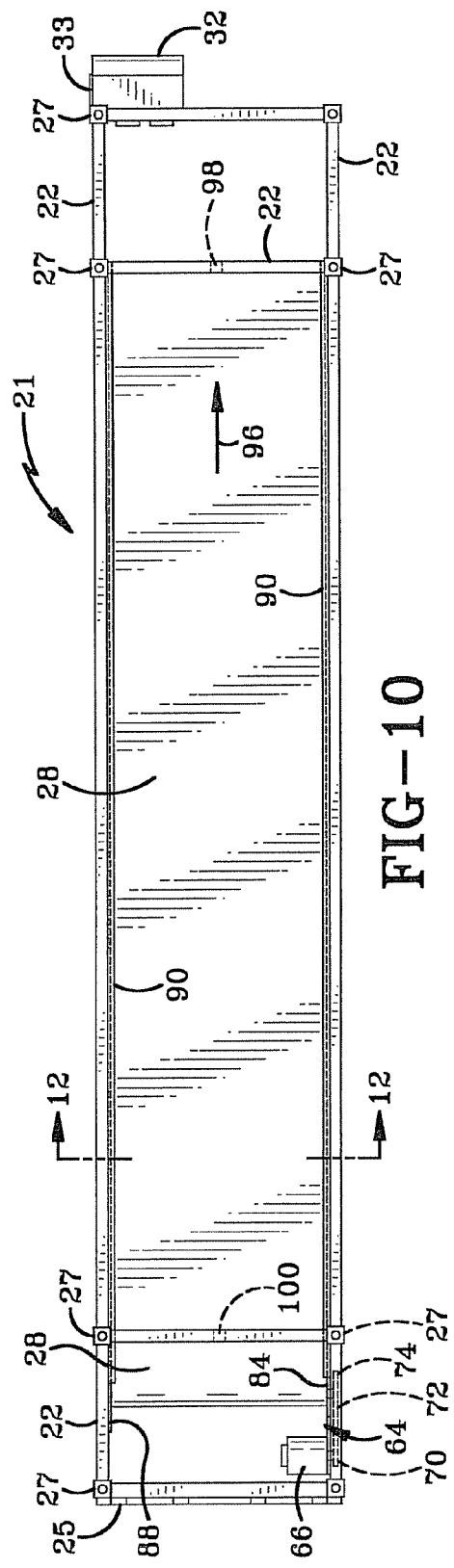

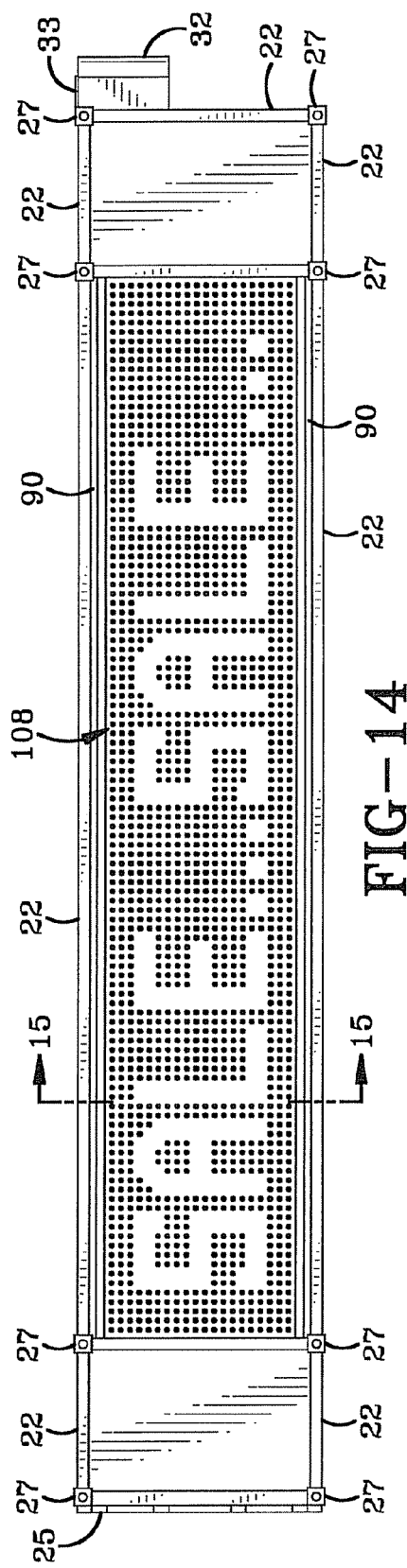
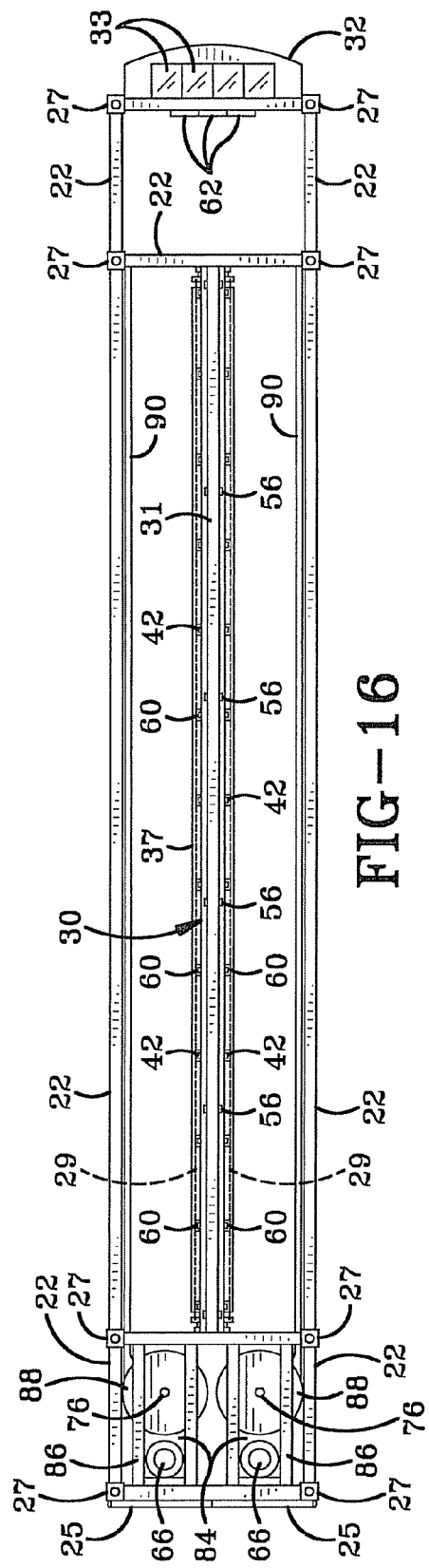
FIG-14
FIG-16

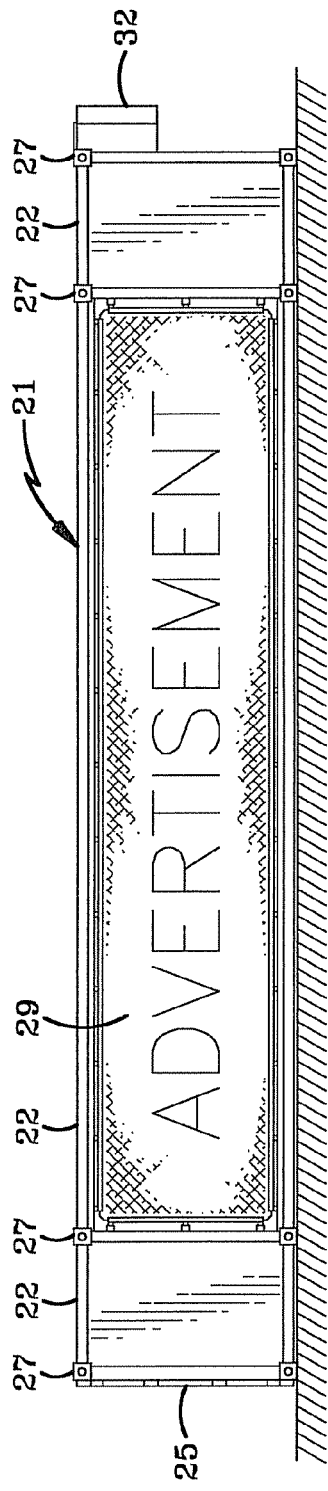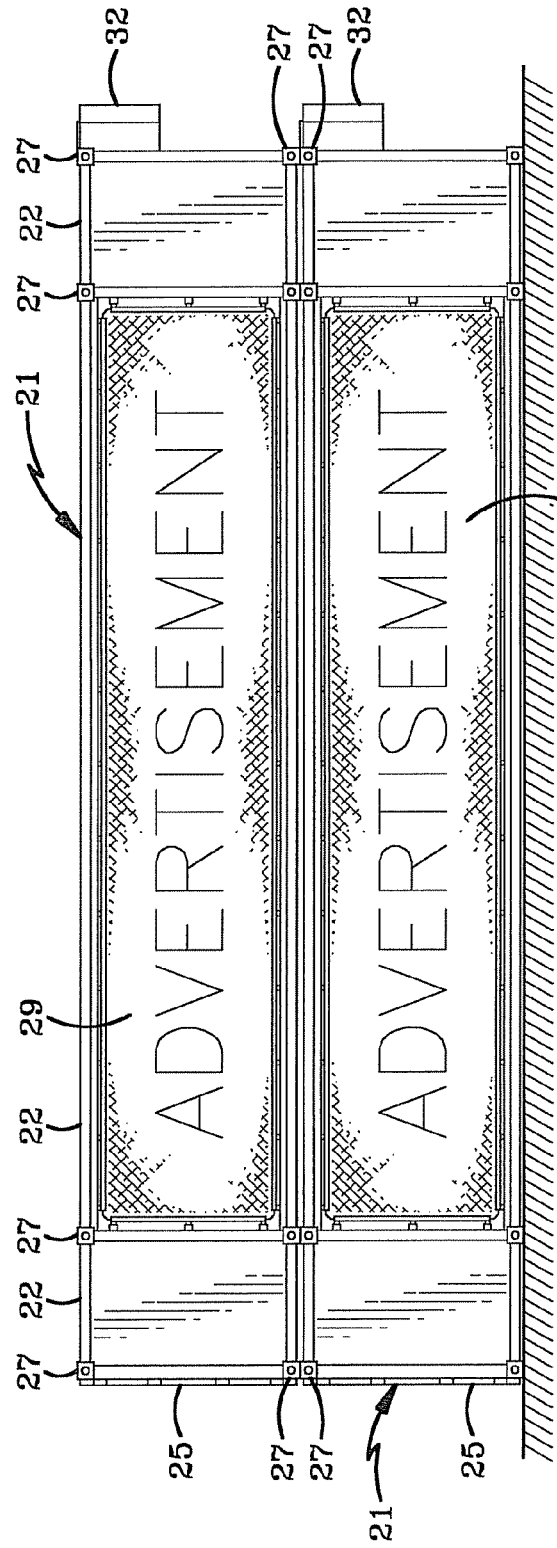

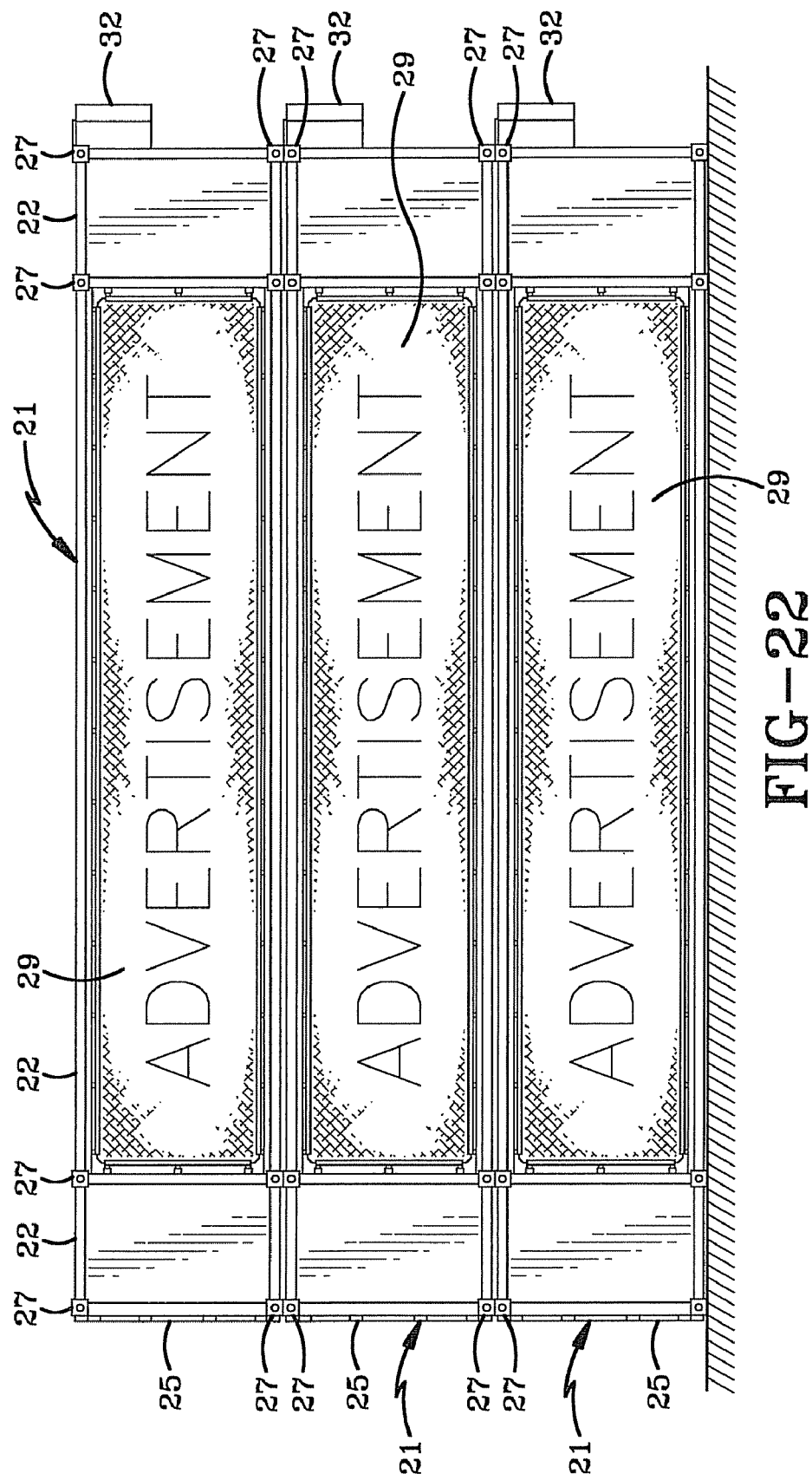

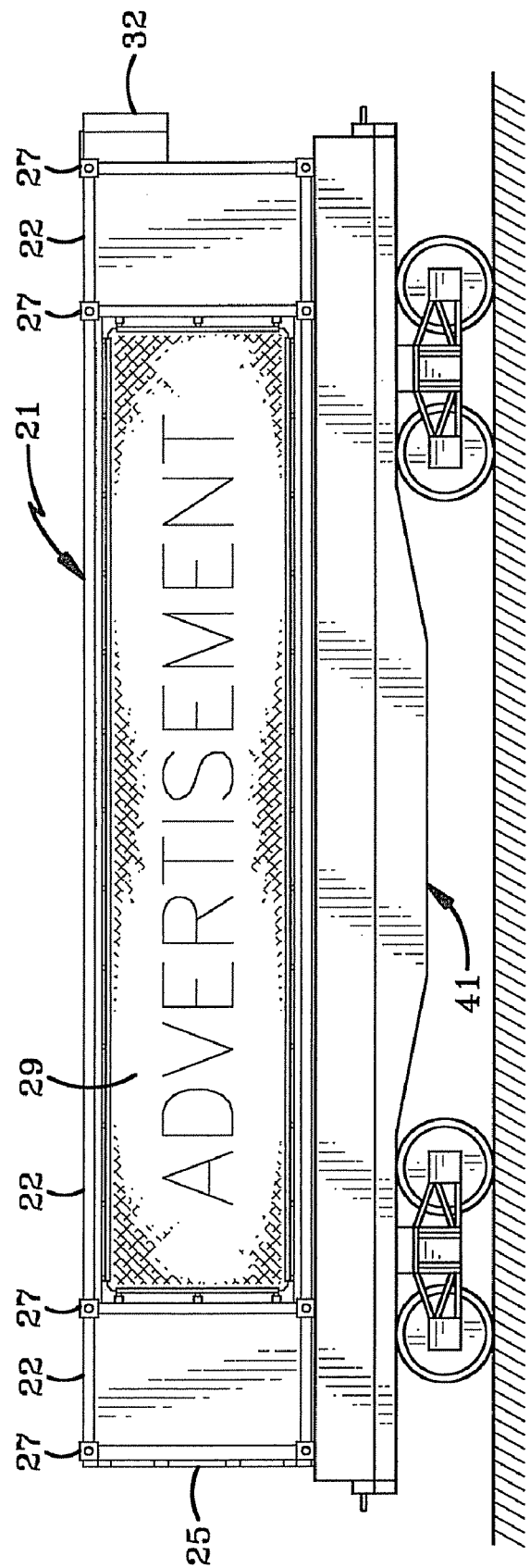

PORTABLE ADVERTISING PLATFORM

CROSS REFERENCE TO RELATED APPLICATIONS

This application claims priority to U.S. Provisional Patent Application No. 61/189,627 filed Aug. 21, 2008, which application is incorporated herein by reference.

BACKGROUND OF THE INVENTION

1. Technical Field

The invention relates generally to a portable advertising billboard, customizable advertising system, and a method of providing portable advertising. More particularly, the invention relates to a portable advertising billboard that can be located on a variety of transportation vehicles to provide continuous advertising. Specifically, the invention relates to an ISO compatible self-powered cargo container substitute with advertising material illuminated on one or more sides by backlighting or display boards, either of which are protected by a sealable outer door, that can easily and securely be located on any transportation vehicle capable of transporting a cargo container.

2. Background Information

Stationary advertising is a big part of everyday life, with billboards dotting highways and store signs lining the streets. Portable advertising is generally limited to permanent advertisements fixed or painted on the side of a semi-truck trailer or similar vehicle. Portable advertising, especially on railroad cars, was prominent in the early 1900's but the advertising was painted on the side of the car and therefore permanent. Further, since the railroad cars were not stackable, the advertising space was limited to the dimensions of each individual rail car. Thus, there is a long-felt need for a portable advertising system which is stackable to provide a larger, continuous advertising space.

Modern cargo containers that are ISO compatible have standardized dimensions and mounting points so that the containers may be stacked and located on various transportation devices without special handling equipment. Further, a train may transport numerous ISO containers from point A to point B. However, on the return trip, the train may be pulling empty railroad cars without cargo containers and effectively wasting time and money. Therefore, there is a long-felt need for an efficient means to utilize the empty railroad cars when cargo containers are not being utilized.

Another major setback to the implementation of portable advertising has been the lack of an independent power generation source. Traditional semi-trailers utilize power provided to the trailer from the semi-truck electrical system. Therefore, when the trailer is disconnected, any portable advertising would not have sufficient electrical power to illuminate the display, especially at night. Thus there is a need for an integrated power generation system which is capable of satisfying the electrical demands of each container without tethering the container to a transportation vehicle.

SUMMARY OF THE INVENTION

The portable advertising system of the present invention comprises a body having a first end and a display support, at least one universal attachment system adapted for securing the body to a vehicle proximate the first end, at least one exterior wall arranged to display an advertisement, and the display support securing an illumination source directed towards the at least one exterior wall. The at least one exterior wall and the illumination source may be integrated into an electronic display unit. The at least one exterior wall may also be an advertising surface composed of vinyl as well as two exterior walls arranged to display at least one advertisement. The illumination source may be a plurality of light emitting diodes or extend outside of the at least one exterior wall and be directed back towards the at least one exterior wall. The portable advertising system also includes at least one protective surface proximate the at least one exterior wall and opposite an interior cavity. The portable advertising system may include a railroad car arranged to receive the at least one universal attachment system.

Further, an advertising surface tensioning system having a tension device and a tension sensor may be included, wherein the tension device maintains a constant tension force throughout the advertising surface and the tension sensor indicates the condition of the advertising surface. The present invention may further include a power generator, a photo cell, and global positioning sensor, wherein the generator provides electrical power, the photo cell at least partially controls the illumination source, and the global positioning sensor provides tracking information. The generator may be a diesel or gasoline powered generator or an array of solar panels. The portable advertising system may be at least two portable advertising systems wherein the at least one universal attachment system of a first of the at least two portable advertising systems is stacked on top of the at least one universal attachment system of a second of the at least two portable advertising systems.

The method of portable advertising of the present invention includes disposing a display support within an interior cavity of a body having at least one universal attachment system, powering an illumination source, displaying an advertisement on an advertising surface, and directing the illumination source towards the advertising sheet. The method includes tensioning the advertising sheet, monitoring the tension in the advertising sheet, controlling the illumination source output based on the monitoring of the advertising sheet tension, covering an outer portion of the advertising sheet with a protective panel, and attaching the at least one universal attachment system of the body to a transportation vehicle.

BRIEF DESCRIPTION OF THE DRAWINGS

The preferred embodiments of the invention, illustrative of the best modes in which Applicant has contemplated applying the principles of the invention, are set forth in the following description and are shown in the drawings.

FIG. 2 is a perspective view of a preferred embodiment portable advertising system with exterior panels and a portion of the advertising material removed;

FIG. 3 is a side elevation view of a preferred embodiment portable advertising system with a portion of the illumination source seen through a removed portion of the advertising surface;

FIG. 4 is a top plan view of the preferred embodiment portable advertising system of FIG. 3 with the exterior panels removed;

FIG. 9 is a side elevation view of a preferred embodiment portable advertising system with the protective panel partially closed;

FIG. 10 is a side elevation view of a preferred embodiment portable advertising system with the protective panel completely closed;

FIG. 14 is an elevation view of a second preferred embodiment portable advertising system;

FIG. 16 is a top plan view of another second preferred embodiment portable advertising system with exterior panels removed;

FIG. 20 is a side elevation view of a preferred embodiment portable advertising system shown located on the ground;

FIG. 21 is a side elevation view of two preferred embodiment portable advertising systems stacked one on top of the other;

FIG. 22 is a side elevation view of three preferred embodiment portable advertising systems stacked on top of one another;

FIG. 23 is a side elevation view of a preferred embodiment portable advertising system located on a railroad car;

DESCRIPTION OF THE PREFERRED EMBODIMENTS

At the outset, it should be appreciated that like drawing numbers on different drawing views identify identical, or functionally similar, structural elements of the invention. While the present invention is described with respect to what is presently considered to be the preferred embodiments, it is to be understood that the invention as claimed is not limited to the disclosed aspects.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

The portable advertising system of the present invention is indicated generally at container 21, as is particularly shown in FIGS. 1 through 26. Container 21 may be shaped and sized similar to a traditional cargo container and arranged to be located on any number of compatible transportation vehicles. In particular, container 21 is generally rectangular in shape with longer side walls than end walls. In FIGS. 1 through 4, container 21 is shown in isolation, but functions in the same manner whether sitting on the ground or in transit.

Figure 1:
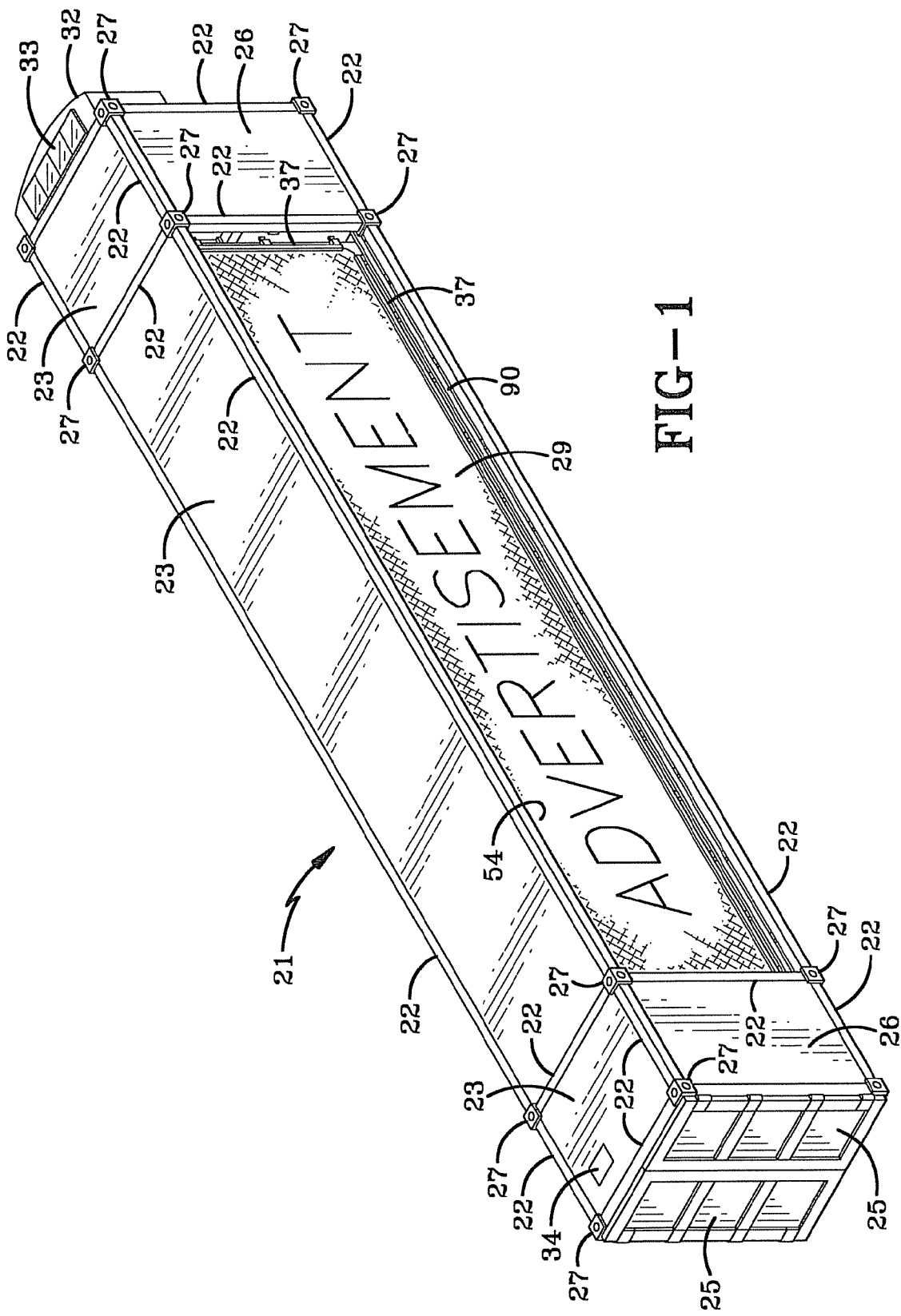
FIG. 1 is a perspective view of a preferred embodiment portable advertising system.

Beginning with FIG. 1, container 21 consists of frame supports 22 which form the generally rectangular shape of the preferred embodiment container frame, although any suitable shape container may be used. Roof 23 sits adjacent the upper frame supports and floor 24 is located adjacent the lower frame supports. Accordingly, roof 23 and floor 24 form the upper and lower boundaries of container 21. Doors 25 are shown enclosing only one end of container 21, however the container may include doors 25 at both ends and attached to the end with hinges. Walls 26 are located around the perimeter of container 21 and between frame supports 22 to seal off the remainder of container 21 to form a body with an interior cavity 52 surrounded by roof 23, floor 24, doors 25, and walls 26.

Container 21 further includes a universal attachment system 27 in the form of ISO locks disposed about the perimeter of the container. ISO locks are standard alignment and securing devices in the container industry. The ISO locks ensure compatibility between the transportation vehicle and the container, as well as allowing containers to be stacked on top of one another. The ISO locks include mounting holes on one surface and protrusions on a second surface. Universal attachment system 27 is located at a specified distance from each other and thus provides standardized container dimensions. Accordingly, with the use of ISO locks, containers can easily be transferred from one transportation vehicle to another without the need for special mounting or loading equipment. The universal attachment system generally includes eight ISO locks on each face of container 21, whereby four ISO locks of each face are on each end of the container body.

While walls 26 form the exterior side walls of container 21, a protective panel 28 extends for much of the length and height of container body advertising opening 54 and acts to protect the advertising surface (described infra). As particularly seen in FIGS. 2 through 4, protective panel 28 may be housed proximate doors 25 and stored in a rolled stated. Advantageously, this allows the protective panel to encompass a minimal amount of space when not in use. When needed, protective panel 28 is unraveled and creates an exterior wall that seals between frame supports 22 while preventing damage to the advertising surface and interior cavity 52 of the container. Interior cavity 52 may also function as a storage area allowing the container to store or transport goods. Protective panel 28 may be composed of steel, aluminum, plastic, or any other material that is suitable to protect the advertising surface. Further, the protective panel need not be located completely within one end or be stored in a rolled state, but instead may be disposed about the upper surface, in a stacked state, in multiple ends of the container, or any other suitable arrangement, all of which are within the spirit and scope of the invention as claimed.

In accordance with one of the main features of the present invention, FIG. 1 illustrates container 21 with advertising surface 29 as an exterior central side wall. Advertising surface 29 is centrally located along the side of container 21 and extends from roof 23 to floor 24 such that the advertising space is maximized. Preferably, advertising surface 29 may be semitransparent and may incorporate a back-light to emphasize the advertising as well as permit advertising at night. In a preferred embodiment, advertising surface 29 is composed of vinyl. Nevertheless, advertising surface 29 may be composed of any suitable material that is weather resistant and suitable for displaying an advertisement in an outdoor environment. When container 21 is used in an indoor environment, the advertising surface need only be composed of a suitable material for displaying an advertisement and does not need to be weather resistant.

Moving on to FIG. 2, internally, but generally proximate advertising surface 29 is an illumination source 30 in a preferred embodiment. Illumination source 30 is secured to container 21 through display support 31. The illumination source may be any suitable type, including but not limited to incandescent, light emitting diodes, or fluorescent bulbs. Display support 31 is attached to frame supports 22 and is both parallel and adjacent to advertising surface 29. In a preferred embodiment, the display support and illumination source are the same length as the advertising surface, although the size of the illumination source may be reduced and appropriately arranged to back-light the entire advertising surface with a smaller illumination source.

In a preferred embodiment, display support 31 is connected to illumination source 30 with brackets 56. Specifically, the illumination support includes a mounting beam 58 which secures illumination source 30 to display support 31. Thus, illumination source 30 is secured to container 21 through display support 31, brackets 56, and mounting beam 58.

FIGS. 1 through 4 illustrate container 21 having two illumination sources directed outwards, one on each side, as well as two advertising surfaces 29. In this arrangement, each advertising surface may contain the same or different indicia printed on the surface. Advantageously, this allows the container to provide more than one advertising surface on a single container.

Averting now to FIG. 4, which is a top view of container 21 with roof 23 removed. Generator 32 and photo cell 33 are located at the end of container 21 that is opposite doors 25. Generator 32 provides electrical power to the illumination source or electronic display unit as necessary, therefore container 21 is a self-contained unit and does not need an external power supply. Generator 32 provides current to batteries 62. The generator may be a diesel, gasoline, solar, or any other similarly situated power supply device. Photo cell 33 is used to indicate the environmental light conditions and to engage the generator to provide electrical power as needed. Thus, when photo cell 33 indicates a low light condition, the generator is engaged to supply electrical current to the illumination sources. Further, an array of photo cells may be used to function as a solar power generation source to provide electrical current as needed. Additionally, battery-powered global positioning sensor 34 is included in the roof to provide continuous tracking of the container for logistical and advertising related purposes. Thus, the container owner can sell advertising on a piecemeal basis for different areas of the country on a single container based upon the location of the container.

Figure 5:
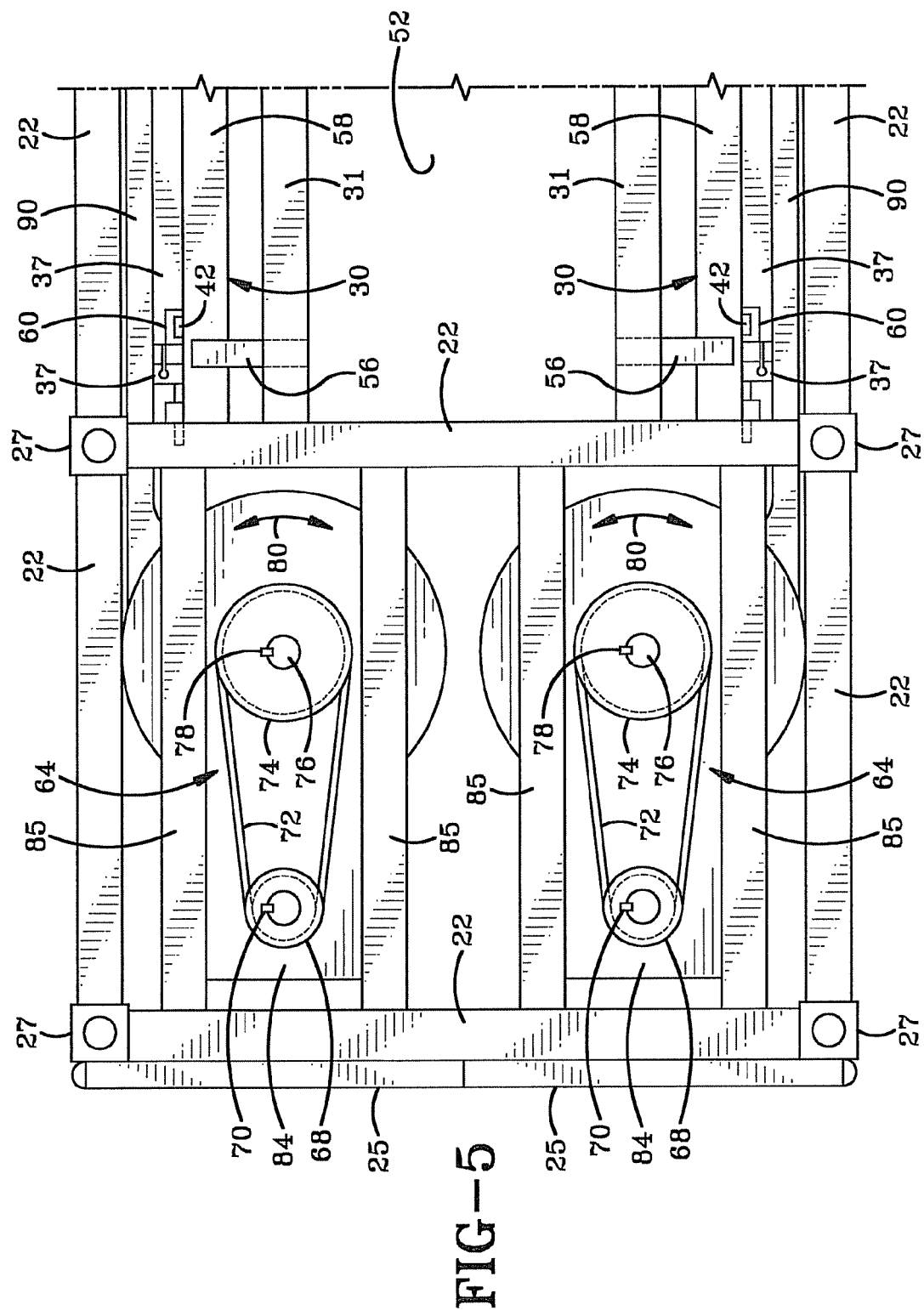
FIG. 5 is an enlarged bottom view of a preferred embodiment protective panel system.
Figure 6:
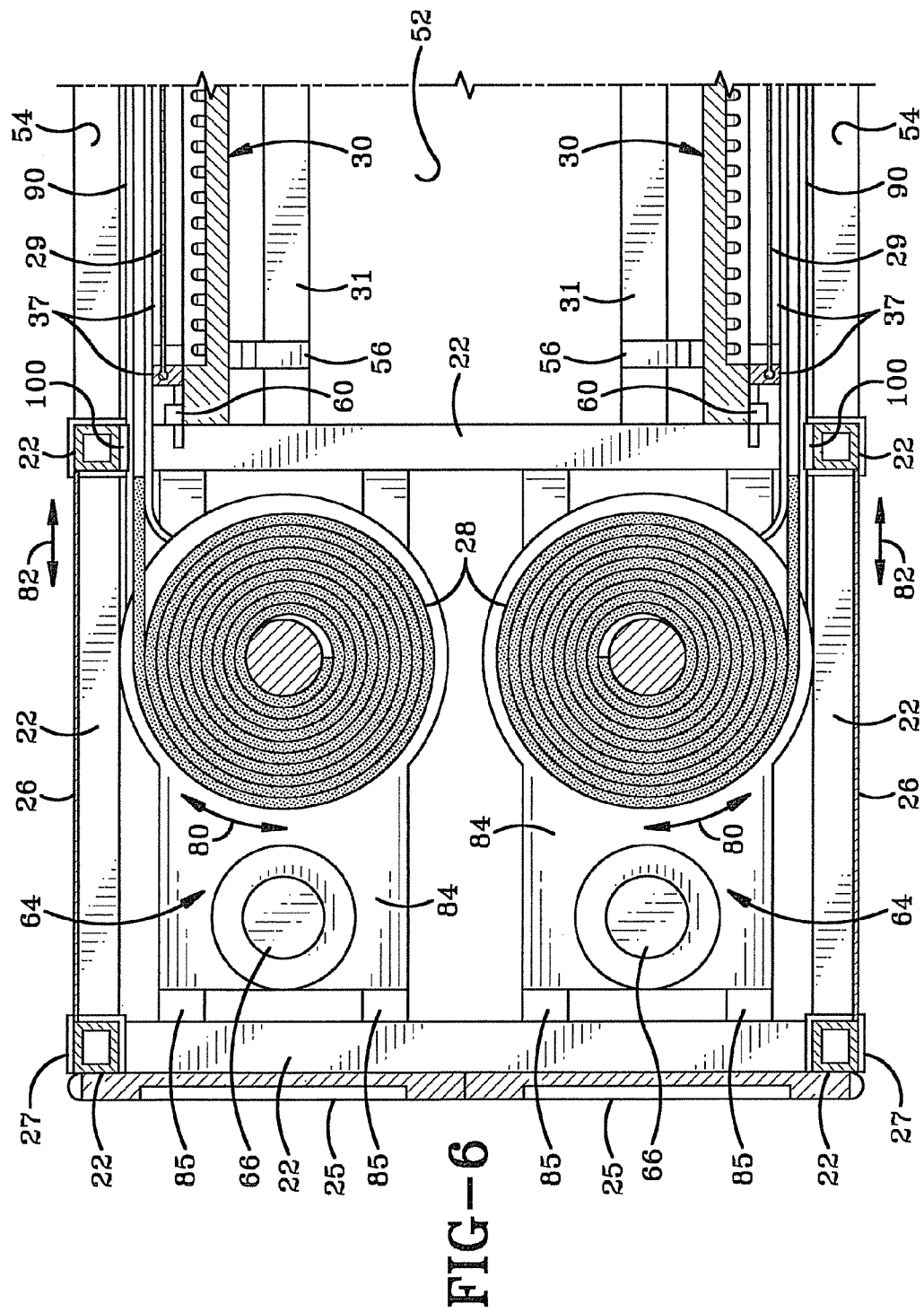
FIG. 6 is a partial cross-sectional view of the preferred embodiment protective panel system operation taken generally along line 6-6 in FIG. 3.

FIGS. 5 and 6 illustrate a protective panel system 64 with the protective panel 28. Specifically, each protective panel system 64 includes a motor 66 with a pulley 68 on a bottom portion. Pulley 68 is secured to the motor with a key 70 and a belt or chain 72 interconnects pulley 68 and a panel pulley 74. Panel pulley 74 is secured to spindle 76 with a key 78. Thus, during operation of motor 66, a rotation in the direction associated with arrows 80 is achieved to force protective panel 28 in the directions associated with arrows 82. Further, the protective panel system preferably includes a base panel 84 secured on a pair of support beams 85 which separate the pulleys from the motor and protective panel. As seen in FIGS. 2 and 3, the top of protective panel system 64 includes a pair of support beams 86 which are secured to upper support panel 88.

Figure 7:
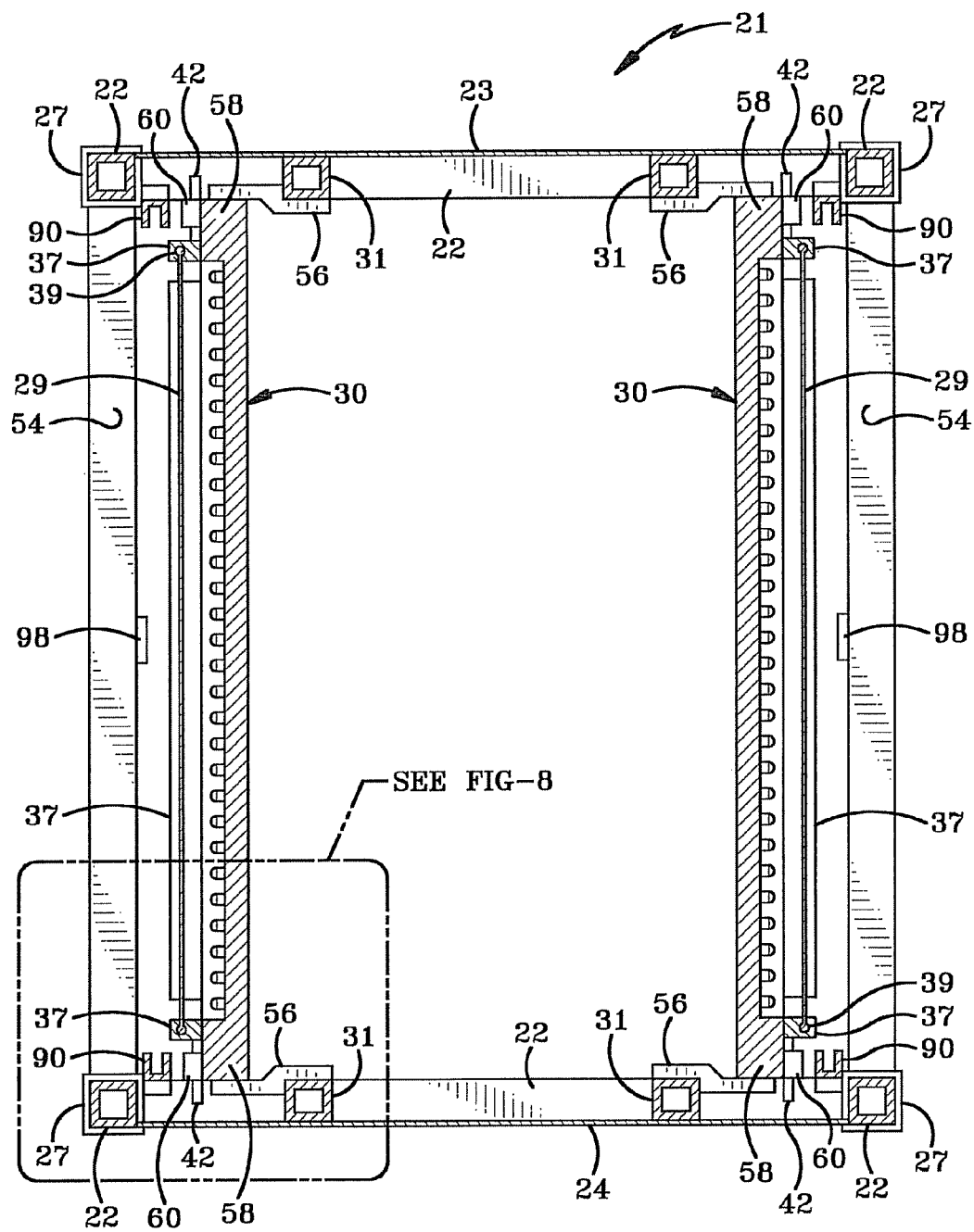
FIG. 7 is a section view of a preferred embodiment portable advertising system taken generally along line 7-7 in FIG. 3.

In accordance with yet another main feature of the present invention, FIG. 7 is a section view of container 21 with protective surface 28 not in use but illustrating protective panel track 90. Panel track 90 is preferably U-shaped to contain the protective panel during operation. Further, advertising surface tensioning system 35 is located between illumination source 30 and protective surface 28. In particular, tensioning system 35 is attached to and on the same plane as advertising surface 29. Tensioning system 35 includes tension mounts 60 in combination with tension devices 42 and grooved holders 37. In particular, the tension devices connect grooved holders 37 and tension mounts 60 while further maintaining a constant and consistent tension.

Grooved holders 37 include a grooved portion 39 which is arranged to hold advertising surface 29. Advantageously, the grooved portion secures the advertising surface and allows the advertising surface to be maintained in a consistent appearance without the possibility of ripping the advertising surface. Grooves holders 37 are also arranged to align advertising surface 29 in the vertical and horizontal direction by locating the upper portion of the advertising surface within the upper groove and the lower portion of the advertising surface in the lower groove. Accordingly, groove holders 37 function to center and tension the advertising surface and ensure an aesthetically pleasing advertisement. Although the tensioning system is shown and described using grooved holders 37, tension devices 42 may be attached to advertising surface 29 through an eyelet embossed in the surface, an adhesive, or other suitable connection.

Figure 8:
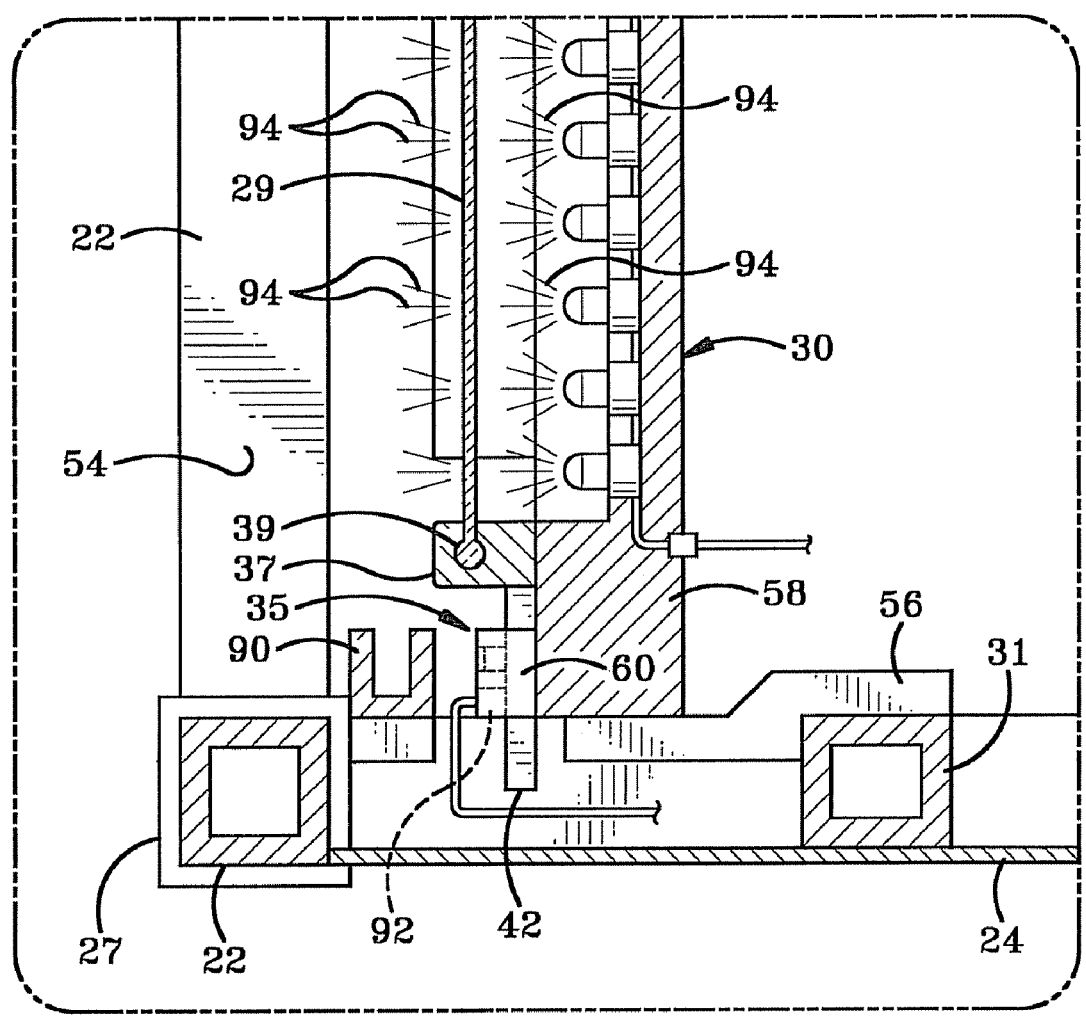
FIG. 8 is an enlarged view of section FIG. 8 in FIG. 7.

FIG. 8 is an enlarged view of the advertising surface and tensioning system. The tensioning system also includes a tension sensor 92 which prevents operation of the illumination system when there is a tear in the advertising material and the tension devices 42 are unable to maintain a consistent tension. For example, if the tension sensor fails to detect tension in one of the tension devices, the advertising surface may be ripped or torn and must be repaired. Therefore, during proper operation, the tension devices maintain a constant tension until a rip or tear occurs. As further seen in FIG. 8, the illumination source 30 is activated and providing light indicated by lines 94, a few of which extend through advertising surface 29.

FIGS. 9 and 10 are views of the protective panel system in operation. Specifically, FIG. 9 illustrates protective panel 28 extending in the direction associated with arrow 96 in the direction of protective panel closed sensor 98. FIG. 10 illustrates the protective panel in the closed position and protective panel 28 in contact with sensor 98. Accordingly, when protective panel 28 is in contact with closed sensor 98, the illumination source is inactive. Further, a protective panel open sensor 100 is located proximate the opposite end of container 21. Advantageously, open sensor 100 functions to indicate that protective panel 28 is either completely open or at least partially closed. Thus, illumination source 30 will only operate when open sensor 100 indicates that the protective panel is completely open and the advertising surface is completely visible.

Figure 11:
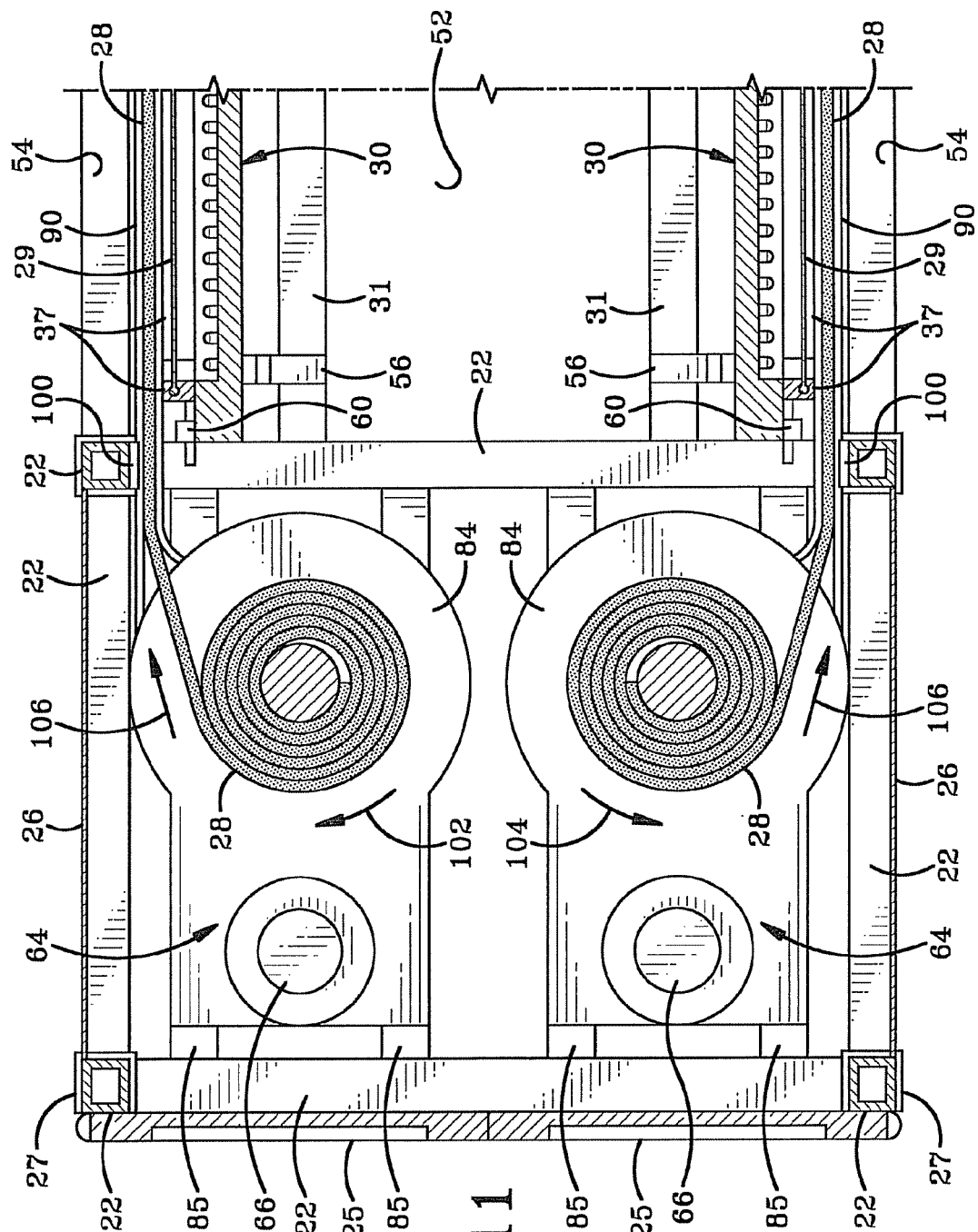
FIG. 11 is an enlarged bottom view of the preferred embodiment portable advertising system taken generally along line 11-11 in FIG. 9 with the protective panel partially closed.
Figure 12:
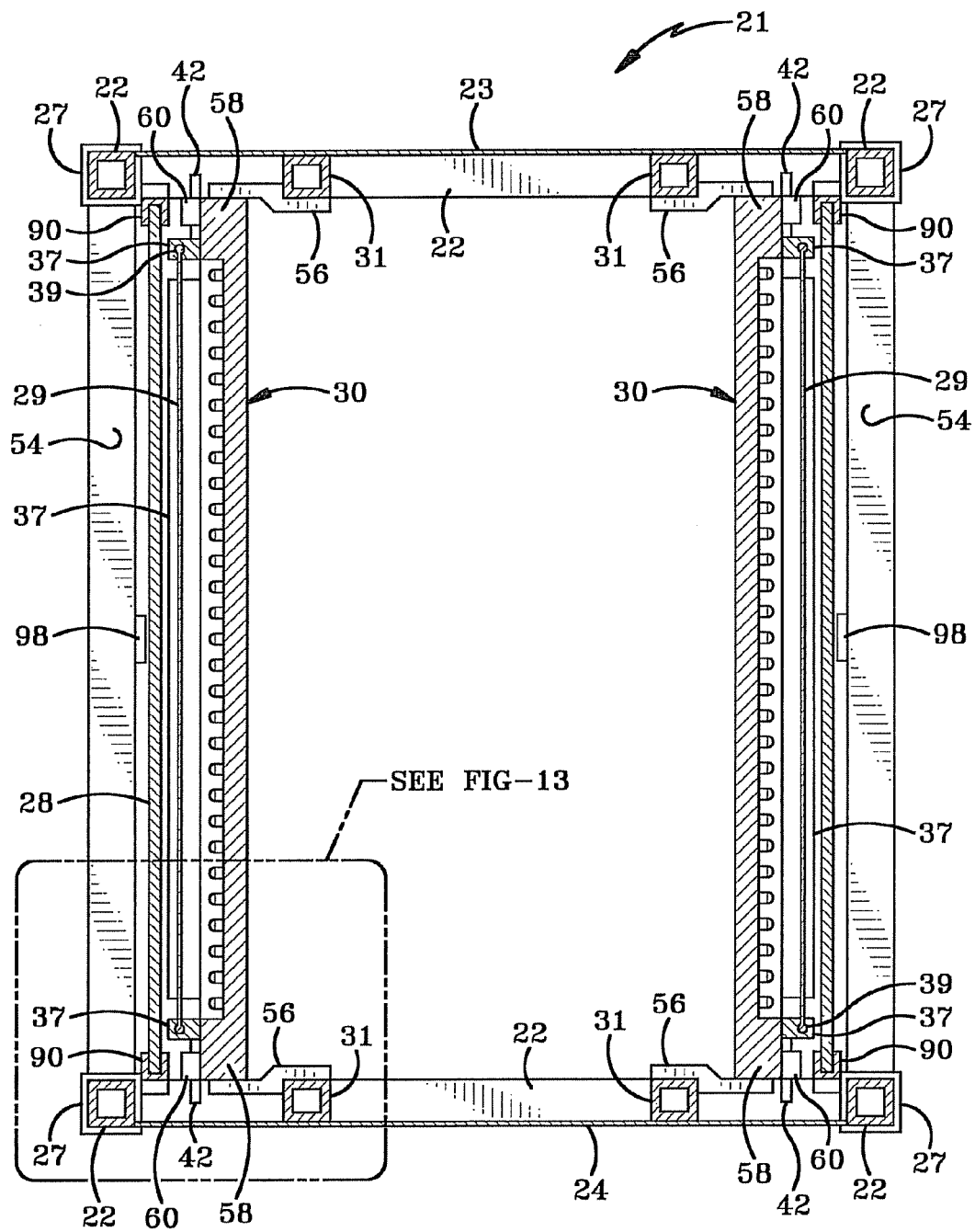
FIG. 12 is a section view of the preferred embodiment portable advertising system taken generally along line 12-12 in FIG. 10 with the protective panel closed.
Figure 13:
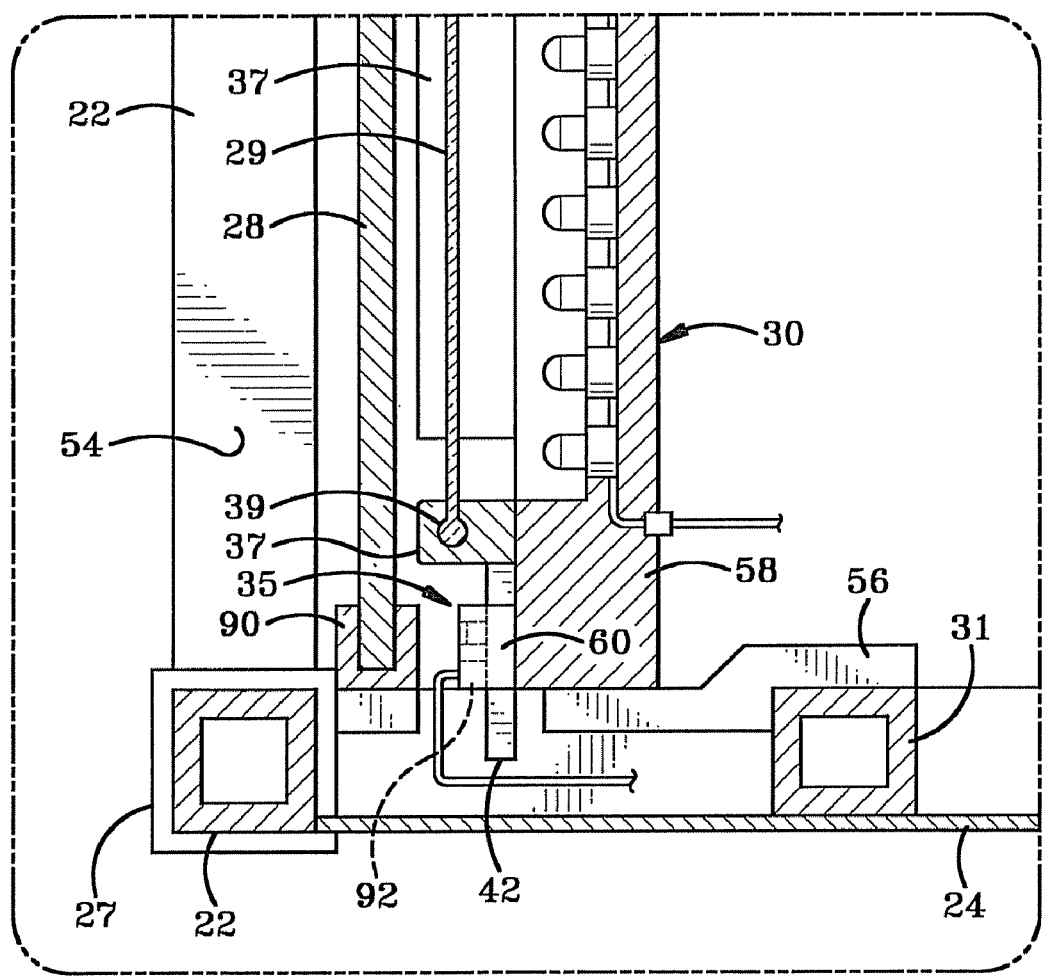
FIG. 13 enlarged view of section FIG. 13 in FIG. 12.

FIGS. 11 through 13 illustrate the protective panel system in the closing and closed positions. Motors 66 operate to rotate spindle 76 and protective panels 28 in the directions associated with arrows 102 and 104. This rotation extends protective panels 28 in the direction associated with arrows 106 to protect advertising surfaces 29.

Having described the structure of a first embodiment, only those portions of the second embodiment which are different from the first embodiment are described in detail. Likewise, similar numerals refer to similar parts throughout the various embodiments.

Figure 15:
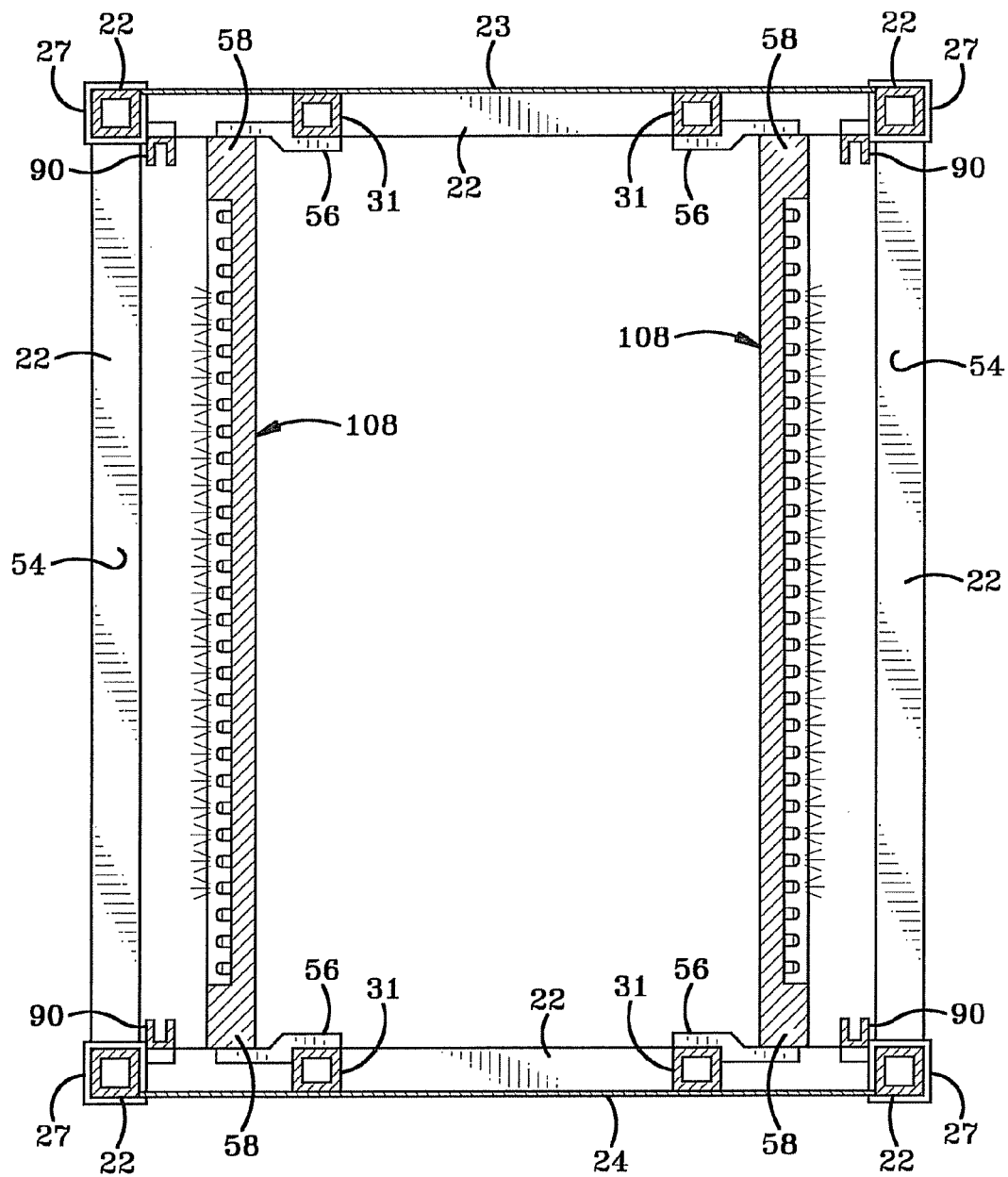
FIG. 15 is a section view of the second preferred embodiment portable advertising system taken generally along line 15-15 in FIG. 14.

In accordance with yet another main feature of the present invention and in a second preferred embodiment, the container includes an LED array 108 instead of illumination source 30 and advertising surface 29 as particularly seen in FIGS. 14 and 15. LED array 108 may also be a plasma display or liquid crystalline display without departing from the spirit and scope of the invention as claimed. Further, programmable LEDs, an array of displays, or other acceptable units capable of displaying an image or video generated by a computer or similar graphic display system may be utilized. Accordingly, advertising surface 29 is not used with the electronic display unit and is in fact replaced by the electronic display unit. Advantageously, the use of LED array 108 permits the interior cargo container to be minimized as well as remedying the need for a tensioning system. In addition, the LED array permits the use of a single display support 31 to be utilized. With the reduced space requirements, LED arrays 108 still permit the use of protective panels 28 within tracks 90. The LED array version further allows interchanging the advertisements without the need for expensive and cumbersome advertising surfaces 29.

FIG. 16 illustrates a similar second preferred embodiment, with illumination source 30 arranged back-to-back such that only the single illumination source is needed to back-light two parallel but opposed advertising surfaces. In this arrangement, the central portion of container 21 may be narrowed such that the advertising surfaces are located closer to one another. Although the alternative second preferred embodiment is shown and described using illumination source 30, it is within the spirit and scope of the present invention as claimed to utilize LED arrays 108.

Having described the structure of the first two embodiments, only those portions of the second embodiment which are different from the first two embodiments are described in detail. Likewise, similar numerals refer to similar parts throughout the various embodiments.

Figure 17:
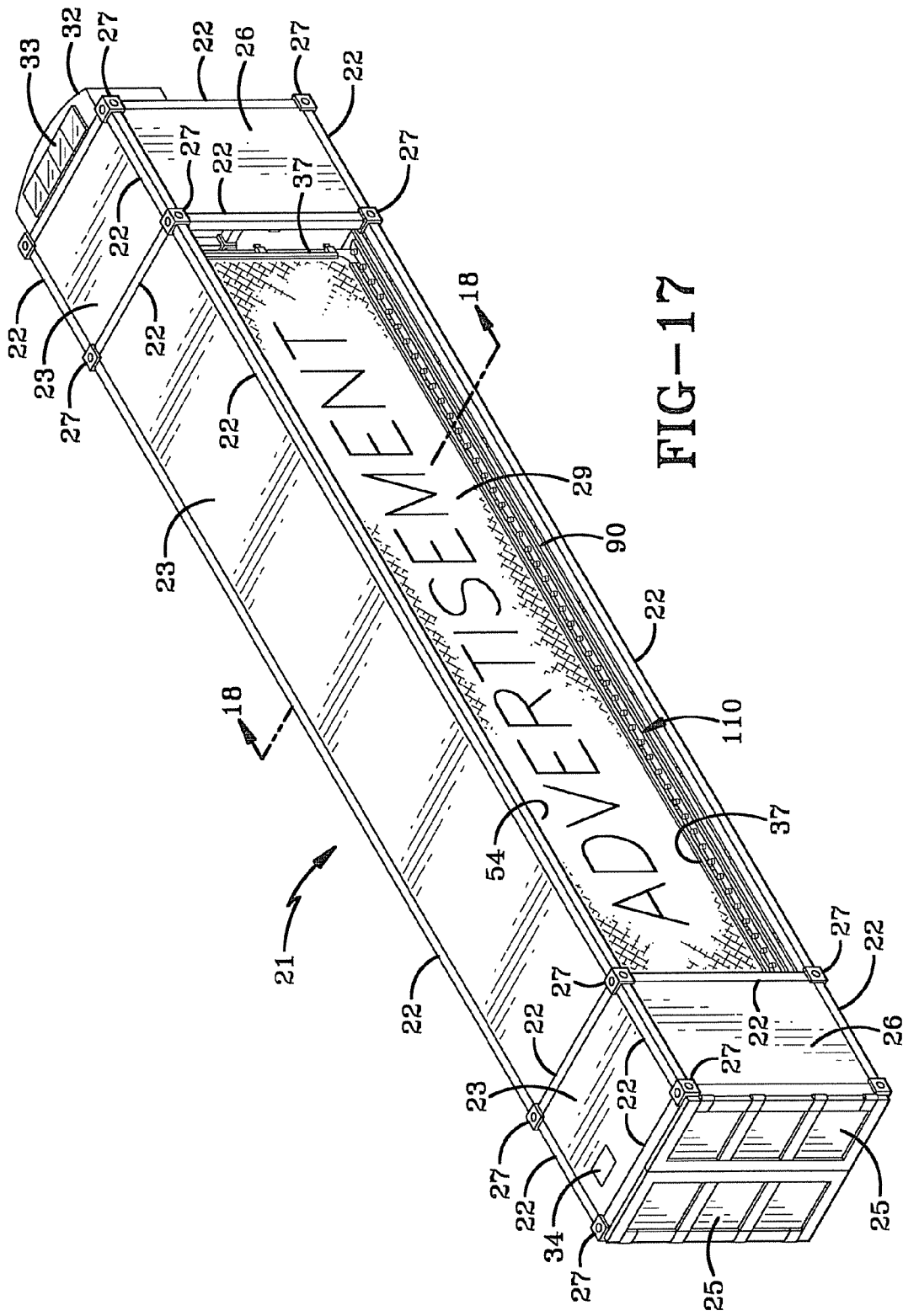
FIG. 17 is a perspective view of a third preferred embodiment portable advertising system with an exterior illumination source.
Figure 18:
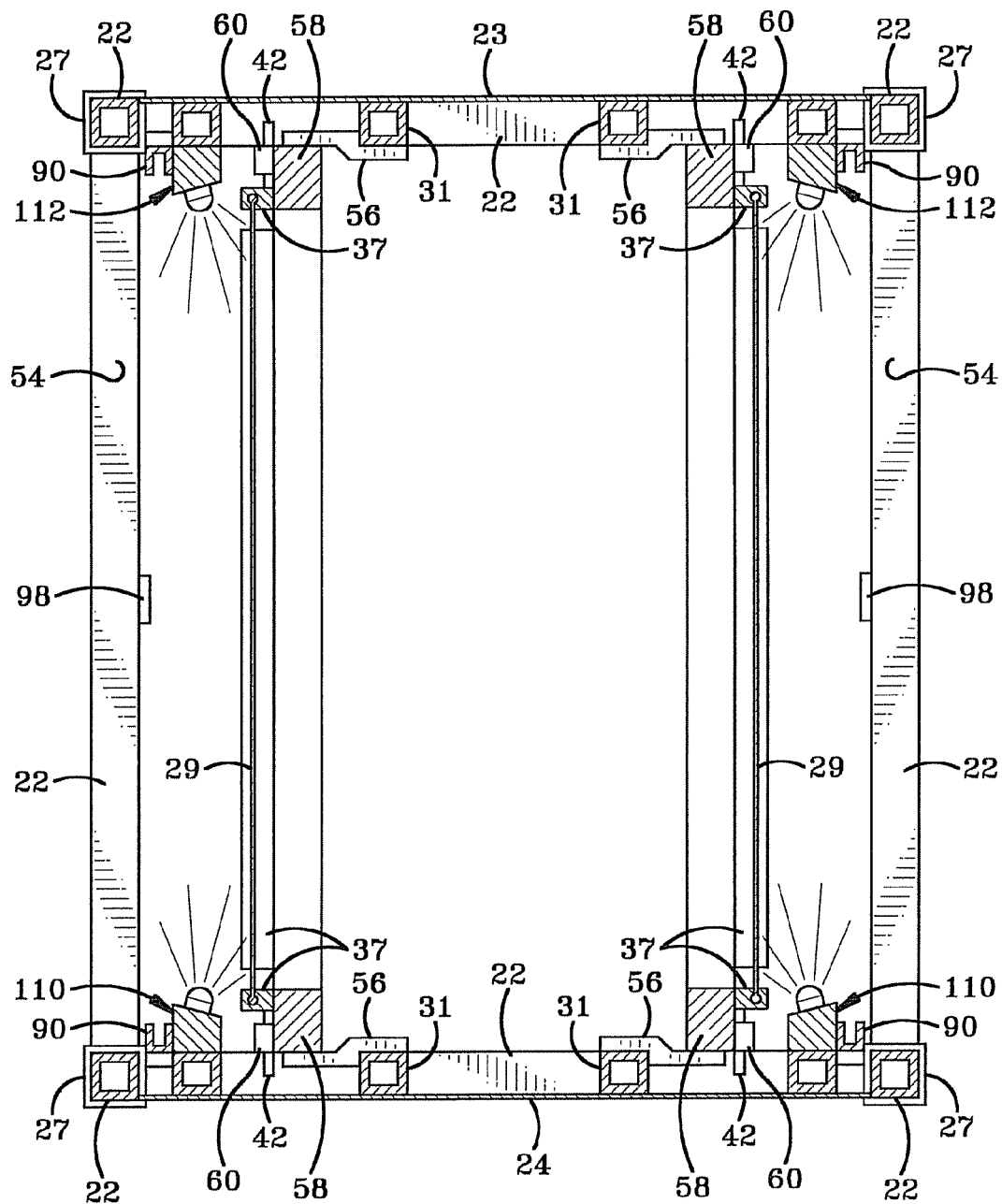
FIG. 18 is a section view of the third preferred embodiment portable advertising system taken generally along line 18-18 in FIG. 17.

FIGS. 17 and 18 illustrate a third preferred embodiment container with advertising surface 29 disposed further inward than the first preferred embodiment. Illumination source 30 has been relocated to the exterior of advertising surface 29. In accordance with still another preferred embodiment, a lower illumination source 110 is located along the length of advertising surface 29 but still located inward of protective panel track 90 thus permitting the continued use of protective panel 28. An upper illumination source 112 is also secured inward of protective panel track 90 but outward of advertising surface 29. Both the lower and upper illumination sources are set at angles directed back towards the advertising surface to provide optimal lighting. The third preferred embodiment provides the advantage of being able to use traditional advertising surfaces which do not require backlighting.

Figure 19:
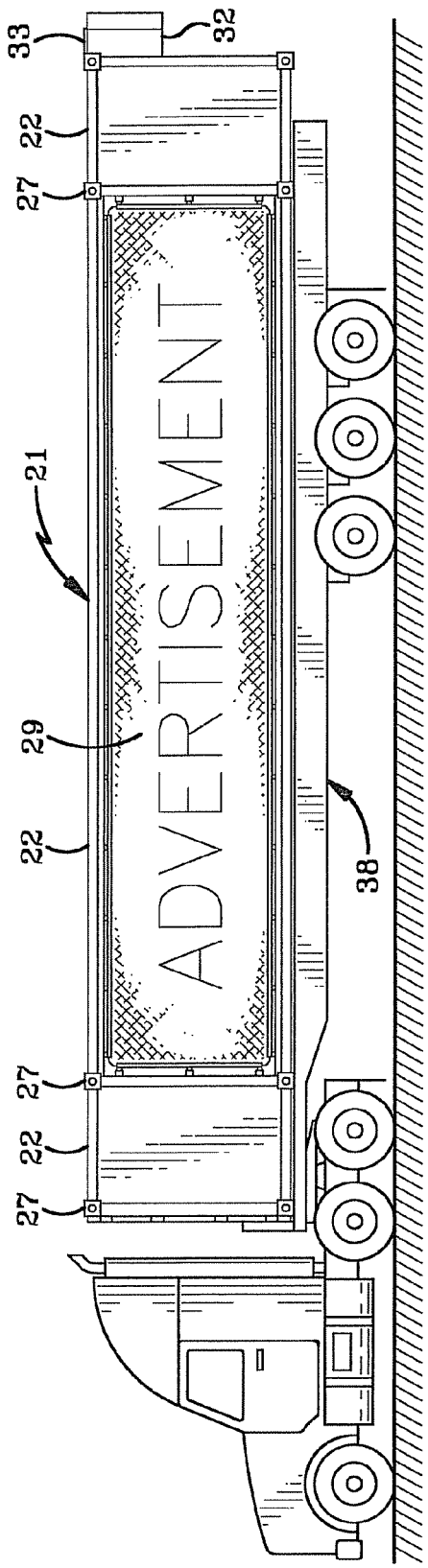
FIG. 19 is a side elevation view of a preferred embodiment portable advertising system located on a truck trailer.

FIG. 19 is a side elevation view of container 21 located on truck trailer 38. Truck trailer 38 is arranged to receive ISO compatible cargo containers. Further, since container 21 includes a power generation system, the container does not need to be connected to the truck's trailer electrical supply and the container can display portable advertising as soon as it is located on truck trailer 38.

FIGS. 20 through 22 are side elevation views of containers 21 located on the ground to function similar to traditional billboards. In particular, the ISO universal attachment system allows the containers to be easily and readily handled as well as stackable. For example, the ISO universal attachment system of a first container connects to the ISO universal attachment system of a second container. While traditional containers are more difficult to stack, the combination of the universal attachment system and the light weight of the containers make stacking a preferable storage and advertising method. Advantageously, container 21 can be moved from a truck trailer or railroad car onto the ground adjacent a roadway and function similar to a billboard.

Further, container 21 includes a spring loaded plate (not shown) at the outer edges of the roof and along the advertising surface. When a container is stacked on top of another container, the lower container's spring loaded plate swings upwards to fill any gap and provide a seamless advertising surface. When the upper container is removed, the spring loaded plate will then swing back downwards to the original position.

Figure 24:
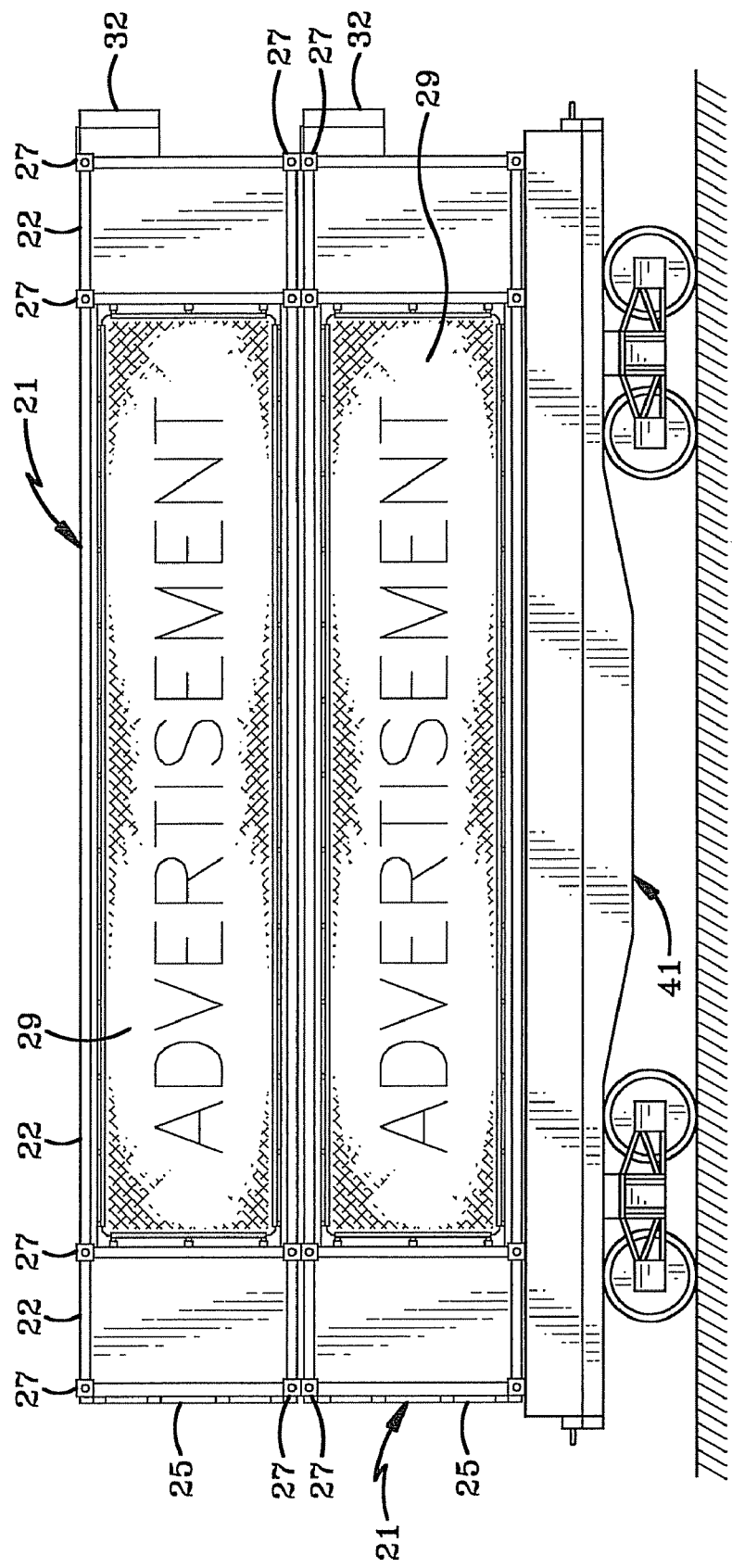
FIG. 24 is a side elevation view of two preferred embodiment portable advertising systems stacked on top of one another and located on a railroad car.

FIGS. 23 and 24 are side views of containers 21 located on railroad car 41. Railroad car 41 includes an ISO universal attachment system arranged to receive compatible containers such as container 21. Accordingly, multiple containers may be stacked atop of one another to increase the advertising space. As described supra, containers 21 include a self contained power generation and supply system which allows use of the advertising surface without requiring an electrical connection between the railroad car and the container.

Figure 25:
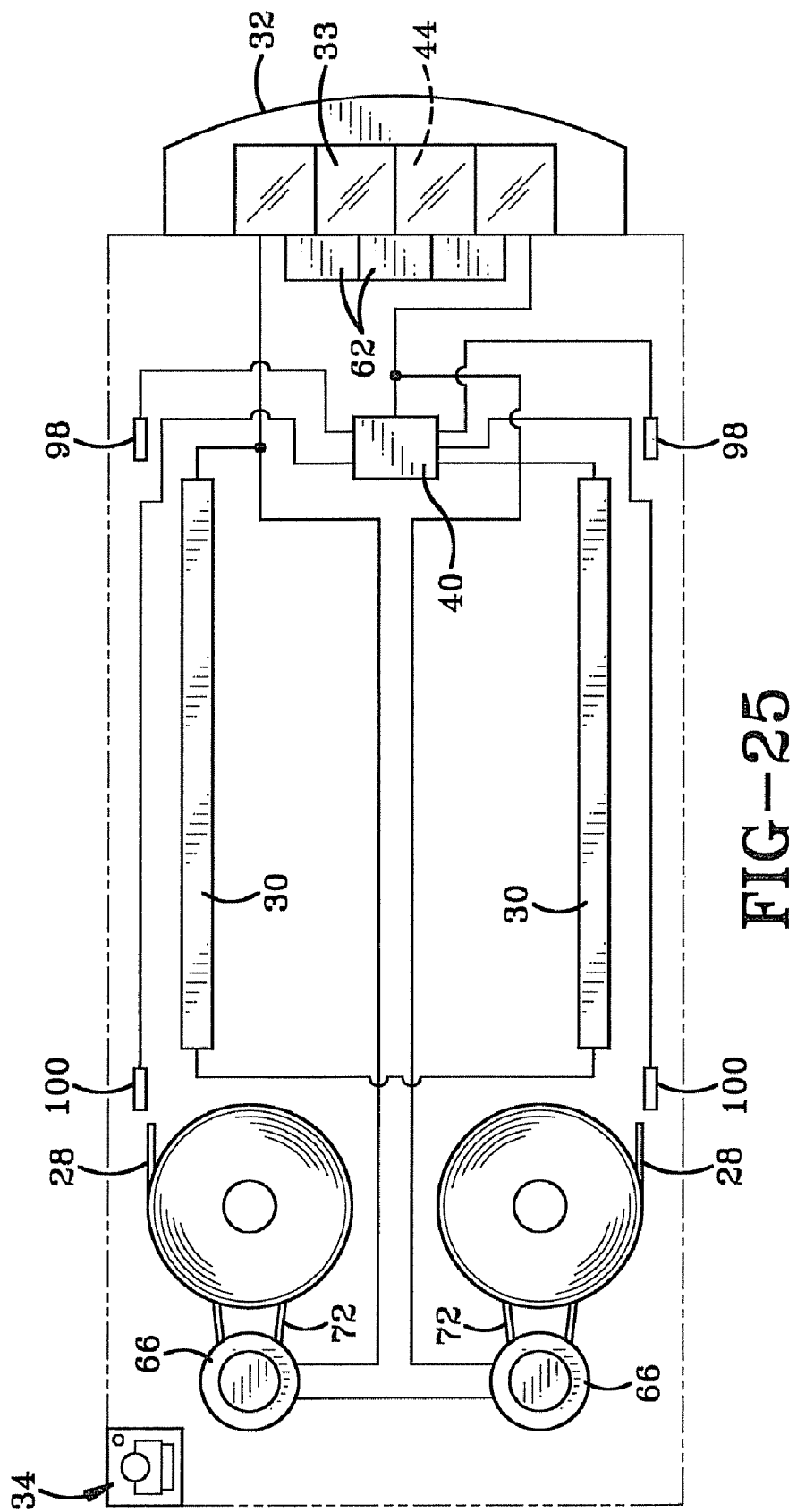
FIG. 25 is an electrical schematic of the power distribution system of a preferred embodiment portable advertising system; and, FIG. 26 is a diagram of the portable advertising system electrical circuit logic.
Figure 26:
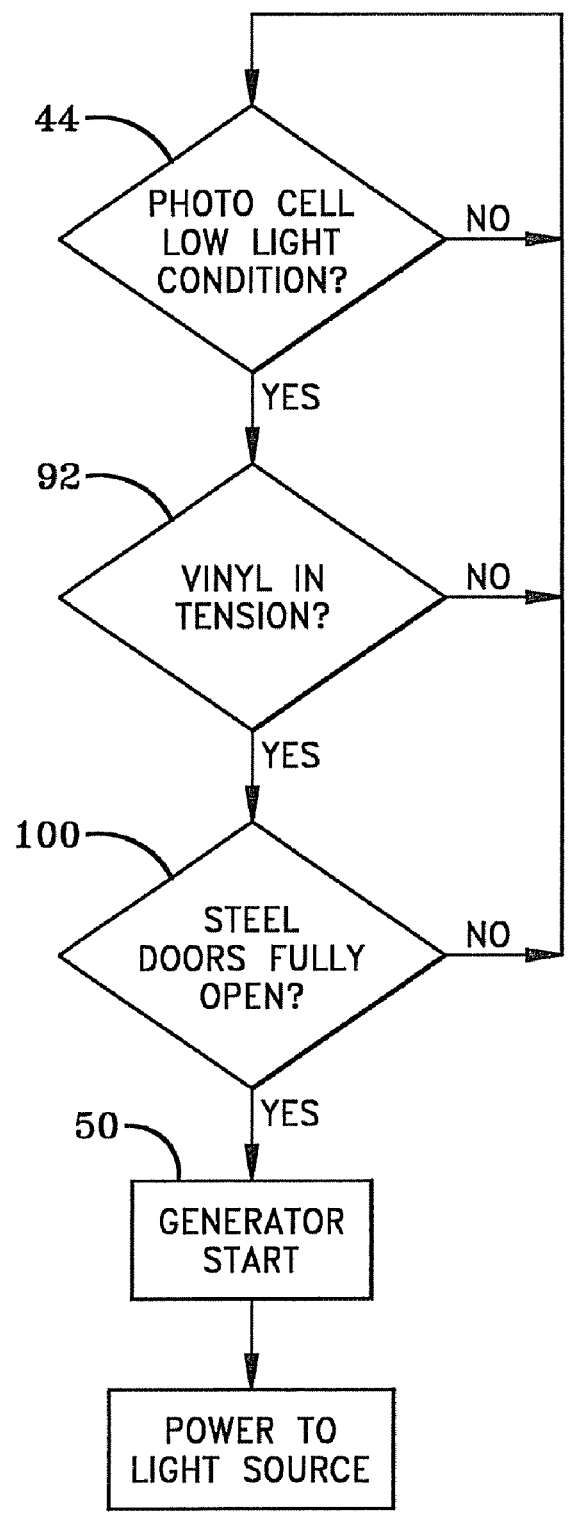

FIGS. 25 and 26 are an electrical schematic of the power distribution system and the electrical circuit logic, respectively. The electrical schematic includes illumination sources 30, generator 32, protective surface motors 66, and control unit 40. Protective surface motors 66 are arranged in series with generator 32, but could also be arranged in parallel. Control unit 40 is arranged in series with generator 32 and both illumination sources 30. As previously described, a photo cell or array of photo cells may be used to indicate a low light condition as well as function as a power supply. Therefore it is within the spirit and scope of the present invention as claimed to include a photo cell as an input sensor to the control unit or as a replacement for generator 32.

The electrical circuit logic includes three inputs which activate control unit 40, photo cell sensor 44, tension sensor 92, and panel open sensor 100. The photo cell sensor continuously loops while a sufficient light is detected. Once photo cell sensor 44 detects that the view of the advertising surface is impaired due to a low light condition, a low light condition signal is transmitted to control unit 40. Once a low light condition is sensed, tension sensor 92 is monitored to ensure that there is tension in the vinyl. While tension sensor 92 indicates that the advertising surface is properly in tension, a signal is transmitted to control unit 40. So long as there is tension at all the tension sensors, panel open sensor 100 is monitored to ensure protective panel 28 is fully open and displaying advertising surface 29.

In a preferred embodiment, if the doors are open, a signal is transmitted from panel open sensor 100 to control unit 40 and indicates the doors are open. The door sensor may be a standard magnetic contact sensor. In operation, so long as all three conditions are met (low light condition, vinyl in tension, and panel fully open) control unit 40 engages generator start sequence 50 and generator 32 is engaged and electrical current is supplied to the illumination source. While the present invention has been described with only three specific circuit logic conditions, it is within the spirit and scope of the invention as claimed to include additional sensors or circuits, remove sensors, or modify sensor functions.

Having described the structure of the present invention, a preferred method of advertising will be described in detail and should be read in light of FIGS. 1 through 26. Although the following is described as a series of steps, no particular order of steps is implied and as such is limited only by the appended claims. Container 21 is formed with a plurality of ISO locks forming universal attachment system 27. Next, display support 31 is welded to container 21. Generator 32 is secured to a front side of container 21 and arranged to provide electrical power to illumination source 30. Next, an advertisement is displayed on advertising surface 29 and illumination source 30 is directed towards the advertising surface. Advertising surface 29 is then tensioned by advertising surface tensioning system 35 and monitored by tension sensor 92. Next, the illumination source output is controlled based on the monitoring of the advertising surface tension. An outer portion of the advertising surface is covered when not in use. Finally, the universal attachment system of container 21 is attached to a transportation vehicle at the ISO locks.

Accordingly, the portable advertising system is an effective, safe, inexpensive, and efficient device that achieves all the enumerated objectives of the invention, provides for eliminating difficulties encountered with prior art devices, systems, and methods, and solves problems and obtains new results in the art.

In the foregoing description, certain terms have been used for brevity, clearness, and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the portable advertising system is constructed and used, the characteristics of the construction, and the advantageous new and useful results obtained; the new and useful structures, devices, elements, arrangement, parts, combinations, and methods are set forth in the appended claims.

What is claimed is:

1. A first portable advertising system comprising:
    a first body having a top, a bottom, a first side, a second side, a first end, a second end and a first display support;
    at least one lower universal attachment system adjacent the bottom;
    at least one upper universal attachment system adjacent the top;
    wherein the at least one lower universal attachment system is adapted for securing the bottom of the body to a vehicle and the at least one upper universal attachment system is adapted for removably securing to the top of the first body another body having at least one lower universal attachment system analogous to the at least one lower universal attachment system of the first portable advertising system;
    at least one exterior wall arranged to display an advertisement; wherein the at least one exterior wall is an advertising sheet;
    said first display support securing a first illumination source directed towards said at least one exterior wall;
    an advertising sheet tensioning system having a tension device;
    a tension sensor; and,
    wherein said tension device maintains a constant tension force throughout the advertising sheet, said tension sensor monitors the condition of the advertising sheet, and an output of the illumination source is controlled based on the condition of the advertising sheet; wherein the tension sensor prevents operation of the illumination source when there is a tear in the advertising material so that the tension device is unable to maintain a consistent advertising sheet tension.

2. The portable advertising system of claim 1 wherein the at least one exterior wall and the illumination source are integrated into an electronic display unit.

3. The portable advertising system of claim 1 further comprising a frame for supporting the advertising sheet and wherein the advertising sheet is flexible.

4. The portable advertising system of claim 1 further comprising:
    a vehicle; and,
    wherein the body is a container having the universal attachment systems and the vehicle retains the container.

5. The portable advertising system of claim 1 wherein the illumination source is one of a plurality of light emitting diodes, an electronic display unit, a liquid crystalline display, and a plasma display.

6. The portable advertising system of claim 1 wherein the at least one exterior wall is two exterior walls arranged to display at least one advertisement.

7. The portable advertising system of claim 6 further comprising an internal cavity at least partially defined by the two exterior walls.

8. The portable advertising system of claim 1 further comprising at least one protective panel proximate the at least one exterior wall and opposite an interior cavity.

9. The portable advertising system of claim 8 wherein the at least one protective panel is secured around an axle and the at least one protective panel and axle are maintained in a rolled state when not in use.

10. The portable advertising system of claim 8 further comprising:
    a storage area; and,
    wherein the at least one protective panel is retained within the storage area when not in use.

11. The portable advertising system of claim 1 further comprising:
    a power generator; and
    a photo cell;
    wherein the generator provides electrical power to the first illumination source and the photo cell at least partially controls the illumination source.

12. The portable advertising system of claim 11 wherein the generator is one of a diesel engine, a gasoline engine, and an array of solar panels.

13. The portable advertising system of claim 1 in combination with a second portable advertising system;
    wherein the first portable advertising system comprises a first self contained power generation and supply system which is mounted on the first body and which provides electrical power to the first illumination source; and
    the second portable advertising system comprises:
    a second body having a top, a bottom, a first end and a second display support;
    at least one exterior wall arranged to display an advertisement;
    the second display support securing a second illumination source directed towards the at least one exterior wall of the second portable advertising system;
    a second self contained power generation and supply system which is mounted on the second body and which provides electrical power to the second illumination source; and
    at least one lower universal attachment system adjacent the bottom of the second body which is removably securable to the at least one upper universal attachment system of the first body so that the second portable advertising system is removably securable and stackable on top of the first portable advertising system.

14. The portable advertising system of claim 1 further comprising:
a railroad car having a plurality of wheels and a bed with at least one universal attachment system; and,
the bed at least one universal attachment system is arranged to receive the body at least one lower universal attachment system.

15. The portable advertising system of claim 1 wherein the illumination source extends outside of the at least one exterior wall and directs illumination back towards the at least one exterior wall.

16. The system of claim 1
wherein the at least one lower universal attachment system comprises
a first universal attachment system adjacent the bottom, first side and first end;
a second universal attachment system adjacent the bottom, second side and first end;
a third universal attachment system adjacent the bottom, first side and second end; and
a fourth universal attachment system adjacent the bottom, second side and second end;
wherein the at least one upper universal attachment system comprises
a fifth universal attachment system adjacent the top, first side and first end;
a sixth universal attachment system adjacent the top, second side and first end;
a seventh universal attachment system adjacent the top, first side and second end; and
an eighth universal attachment system adjacent the top, second side and second end; and
wherein the first, second, third and fourth universal attachment systems are adapted for securing the body to a vehicle and the fifth, sixth, seventh and eighth universal attachment systems are adapted for removably securing to the top of the first body another body having universal attachment systems analogous to those of the first portable advertising system.

17. The system of claim 16 in combination with a second portable advertising system which comprises:
a second body having a top, a bottom, a first side, a second side, a first end, a second end and a second display support;
at least one exterior wall arranged to display an advertisement;
the second display support securing a second illumination source directed towards the at least one exterior wall of the second portable advertising system;
a first universal attachment system adjacent the bottom, first side and first end of the second body;
a second universal attachment system adjacent the bottom, second side and first end of the second body;
a third universal attachment system adjacent the bottom, first side and second end of the second body;
a fourth universal attachment system adjacent the bottom, second side and second end of the second body;
a fifth universal attachment system adjacent the top, first side and first end of the second body;
a sixth universal attachment system adjacent the top, second side and first end of the second body;
a seventh universal attachment system adjacent the top, first side and second end of the second body;
an eighth universal attachment system adjacent the top, second side and second end of the second body;
wherein the first, second, third and fourth universal attachment systems of the second body are respectively removably securable to the fifth, sixth, seventh and eighth universal attachment systems of the second body so that the second portable advertising system is removably securable and stackable on top of the first portable advertising system.

18. The combination of claim 17 wherein the first portable advertising system is substantially identical to the second portable advertising system.

19. The system of claim 1 further comprising
an interior chamber defined by the body;
a first hinge adjacent the first end; and
a first door attached to the body with the first hinge.

20. The system of claim 19 further comprising
a second hinge adjacent the first end;
a second door attached to the body with the second hinge;
wherein the first and second doors enclose the first end of the body.

21. The system of claim 8 wherein the at least one protective panel is formed of one of steel and aluminum.

22. The system of claim 11 wherein the generator is engaged to supply electrical current to the illumination source when the photo cell indicates a low light condition.

23. The system of claim 13 wherein the first portable advertising system is substantially identical to the second portable advertising system.

24. A method of portable advertising comprising the steps of:
providing a display support within an interior cavity of a portable container having at least one universal attachment system;
powering an illumination source mounted on the container;
displaying an advertisement on an advertising sheet mounted on the display support;
directing the illumination source towards said advertisement;
tensioning the advertising sheet;
monitoring the tension in the advertising sheet; and
controlling output of the illumination source based on the step of monitoring the tension.

25. The method of claim 24 further comprising the step of mounting the portable container on a railroad car with the at least one universal attachment system.

26. The method of claim 24 wherein the step of tensioning comprises tensioning the advertising sheet with a tensioning device; and
the step of controlling comprises preventing operation of the illumination source when there is a tear in the advertising sheet so that the tension device is unable to maintain a consistent advertising sheet tension.

27. The method of claim 24 further comprising the step of moving the container from a first location to a second location;
tracking movement of the container from the first location to the second location with a global positioning sensor on the container;
selling advertising to be displayed on the advertising sheet based on the container being at the first location; and
selling different advertising to be displayed on the advertising sheet based on the container being at the second location.

28. A portable advertising system comprising:
a body having a bottom;

at least one universal attachment system adapted for securing the bottom of the body to a vehicle;

an exterior advertising surface;

an illumination source mounted on the body and directed towards the advertising surface; and a protective panel which is external to and covers the advertising surface when the advertising surface is not in use; wherein the protective panel has an open position and a closed position in which the panel covers the advertising surface when the advertising surface is not in use; and further comprising a protective panel open sensor which indicates that the protective panel is in the open position; wherein the illumination source only operates when the open sensor indicates that the protective panel is in the open position.

29. The system of claim 28 wherein the protective panel is formed of one of steel and aluminum.

30. The system of claim 28 further comprising an interior chamber defined by the body;

a first hinge; and a first door attached to the body with the first hinge.

31. A portable advertising system comprising:

a body having a bottom;

at least one universal attachment system adapted for securing the bottom of the body to a vehicle;

an exterior advertising surface;

an illumination source mounted on the body and directed towards the advertising surface; and a protective panel which is external to and covers the advertising surface when the advertising surface is not in use; wherein the protective panel has an open position and a closed position in which the panel covers the advertising surface when the advertising surface is not in use; and further comprising a protective panel closed sensor which indicates that the protective panel is in the closed position; wherein the illumination source is inactivated in response to the protective panel moving from the open position to the closed position.

32. The system of claim 31 further comprising a protective panel open sensor which indicates that the protective panel is in the open position; wherein the illumination source only operates when the open sensor indicates that the protective panel is in the open position.

33. A first portable advertising system comprising:

a first body having a top, a bottom, a first side, a second side, a first end, a second end and a first display support;

at least one lower universal attachment system adjacent the bottom;

at least one upper universal attachment system adjacent the top;

wherein the at least one lower universal attachment system is adapted for securing the bottom of the body to a vehicle and the at least one upper universal attachment system is adapted for removably securing to the top of the first body another body having at least one lower universal attachment system analogous to the at least one lower universal attachment system of the first portable advertising system;

at least one exterior wall arranged to display an advertisement;

said first display support securing a first illumination source directed towards said at least one exterior wall;

at least one protective panel proximate the at least one exterior wall and opposite an interior cavity; wherein the at least one protective panel has an open position and a closed position in which the at least one panel covers the at least one exterior wall; and further comprising a protective panel open sensor which functions to indicate that the at least one protective panel is in the open position; wherein the illumination source only operates when the open sensor indicates that the protective panel is in the open position.

* * * * *